US012561885B2

(12) United States Patent
Kirchmayer et al.

(10) Patent No.: US 12,561,885 B2
(45) **Date of Patent: *Feb. 24, 2026**

(54) METHOD, SYSTEM, AND MEDIUM FOR ARTIFICIAL INTELLIGENCE-BASED COMPLETION OF A 3D IMAGE DURING ELECTRONIC COMMUNICATION

(71) Applicant: MATSUKO s.r.o., Košice (SK)

(72) Inventors: Matŭŝ Kirchmayer, Košice (SK); Gergely Magyar, Vel'ke Kapusany (SK); Mária Virĉíková, Košice (SK); Rudolf Jakša, Košice (SK)

(73) Assignee: MATSUKO s.r.o., Košice (SK)

( * ) Notice: Subject to any disclaimer, the term of this patent is extended or adjusted under 35 U.S.C. 154(b) by 99 days.

This patent is subject to a terminal disclaimer.

(21) Appl. No.: 18/338,093

(22) Filed: Jun. 20, 2023

(65) Prior Publication Data

US 2023/0334754 A1 Oct. 19, 2023

Related U.S. Application Data

(63) Continuation-in-part of application No. 17/538,664, filed on Nov. 30, 2021, now Pat. No. 11,783,531.

(Continued)

(51) Int. Cl.
*G06T 15/04* (2011.01)
*G06T 7/11* (2017.01)
(Continued)

(52) U.S. Cl.
CPC .............. *G06T 15/04* (2013.01); *G06T 7/11* (2017.01); *G06T 7/55* (2017.01); *G06T 7/60* (2013.01);
(Continued)

(58) Field of Classification Search
CPC ......... G06T 7/11; G06T 7/55; G06T 2200/08; G06T 7/60; G06T 15/10;
(Continued)

(56) References Cited

U.S. PATENT DOCUMENTS 5,500,671 A 3/1996 Andersson et al.
6,469,710 B1 10/2002 Shum et al.
(Continued)

FOREIGN PATENT DOCUMENTS

KR 10-2019-0112966 A 10/2019

OTHER PUBLICATIONS

BNP Paribas Real Estate. "DARE—When Science Fiction Becomes Reality", Mar. 2019. https://www.youtube.com/watch?v=13ktlkWppVs&feature=youtu.be.
(Continued)

*Primary Examiner* — Phi Hoang
(74) *Attorney, Agent, or Firm* — Tarolli, Sundheim, Covell & Tummino LLP

(57) ABSTRACT

A method and system for reconstructing a photo-realistic, three-dimensional representation of at least part of a conference participant's head from image data, head alignment data, and depth data. The image data is projected from a world space into an object space using the head alignment data and depth data. In the object space, at least part of the area missing from the image data is completed using a computational model of a person. An artificial neural network is used to reconstruct the texture and depth of the reconstruction as part of the completion. At least the image data and the head alignment data are determined based on two-dimensional or 2.5-dimensional images of the conference participant captured by a camera.

20 Claims, 11 Drawing Sheets

Related U.S. Application Data

(60) Provisional application No. 63/120,061, filed on Dec. 1, 2020.

(51) Int. Cl.
| | |
|---|---|
| *G06T 7/55* | (2017.01) |
| *G06T 7/60* | (2017.01) |
| *G06T 15/10* | (2011.01) |

(52) U.S. Cl.
CPC .......... *G06T 15/10* (2013.01); *G06T 2200/08* (2013.01); *G06T 2207/10016* (2013.01); *G06T 2207/20081* (2013.01); *G06T 2207/20084* (2013.01); *G06T 2207/30201* (2013.01)

(58) Field of Classification Search
CPC . G06T 2207/10016; G06T 2207/30201; G06T 2207/20084; G06T 2207/20081; G06T 11/00; G06T 17/00
See application file for complete search history.

(56) References Cited

U.S. PATENT DOCUMENTS

| | | | |
|---|---|---|---|
| 7,302,466 | B1 | 11/2007 | Satapathy et al. |
| 9,094,660 | B2 | 7/2015 | Alregib et al. |
| 9,661,272 | B1 | 5/2017 | Daniel |
| 9,760,935 | B2 | 9/2017 | Aarabi et al. |
| 10,346,893 | B1 | 7/2019 | Duan et al. |
| 11,087,521 | B1 | 8/2021 | Lombardi et al. |
| 2002/0135581 | A1* | 9/2002 | Russell ..................... G06T 7/11 |
| | | | 345/474 |
| 2004/0066386 | A1 | 4/2004 | Leprevost |
| 2017/0178306 | A1 | 6/2017 | Le Clerc et al. |
| 2018/0211444 | A1 | 7/2018 | Shaviv et al. |
| 2018/0374242 | A1 | 12/2018 | Li et al. |
| 2019/0213772 | A1 | 7/2019 | Lombardi et al. |
| 2019/0294103 | A1 | 9/2019 | Hauger et al. |
| 2020/0021627 | A1 | 1/2020 | Brenes et al. |
| 2020/0098177 | A1* | 3/2020 | Ni ............................. G06T 7/50 |
| 2020/0133618 | A1 | 4/2020 | Kim |
| 2020/0234482 | A1* | 7/2020 | Krokhalev .............. G06T 13/80 |
| 2020/0257891 | A1 | 8/2020 | Cole et al. |
| 2021/0150792 | A1 | 5/2021 | Ulyanov et al. |
| 2021/0286424 | A1 | 9/2021 | Ivanovitch |
| 2021/0342983 | A1 | 11/2021 | Lin et al. |
| 2022/0172424 | A1 | 6/2022 | Vircikova et al. |

OTHER PUBLICATIONS

Dotson, Kyt. "Spatial, Nreal, Qualcomm join up to deliver 5G-enabled AR collaboration killer app", Feb. 2020. https://siliconangle.com/2020/02/20/spatial-nreal-qualcomm-join-deliver-5g-enabled-ar-collaboration-killer-app.

Fink, Charlie. "The Trillion Dollar 3D Telepresense Gold Mine", Nov. 2017. https://www.forbes.com/sites/charliefink/2017/11/20/the-trillion-dollar-3d-telepresence-gold-mine/?sh=256ed6612a72.

Goodfellow et al. "Generative Adversarial Nets", Jun. 2014.

He et al. "Deep Residual Learning for Image Recognition", Dec. 2015.

https://spatial.io.

https://www.doubleme.me/#holoportal.

Iizuka et al. "Globally and Locally Consistent Image Completion", Jul. 2017. http://iizuka.cs.tsukuba.ac.jp/projects/completion/data/completion_sig2017.pdf.

Isola et al. "Image-to-Image Translation with Conditional Adversarial Networks", Nov. 2018.

Jackson et al. "Large Pose 3D Face Reconstruction from a Single Image via Direct Volumetric CNN Regression", Sep. 2017.

Krizhevsky et al. "ImageNet Classification with Deep Convolutional Neural Networks", 2012.

Liu et al. "Image Inpainting for Irregular Holes Using Partial Convolutions", Dec. 2018.

Mildenhall et al. "NeRF: Representing Scenes as Neural Radiance Fields for View Synthesis", Aug. 2020.

Pathak et al. "Context Encoders: Feature Learning by Inpainting".

Ronneberger et al. "U-Net: Convolutional Networks for Biomedical Image Segmentation", May 2015.

Wang et al. "High-Resolution Image Synthesis and Semantic Manipulation with Conditional GANs", Aug. 2018.

Wang et al. "VCNet: A Robust Approach to Blind Image Inpainting", Mar. 2020.

Yu Deng et al.: "Accurate 3D Face Reconstruction with Weakly Supervised Learning: From Single Image to Image Set", Arxiv.Org, Cornell University Library, 201 Olin Library Cornell University Ithaca, NY 14853, Mar. 20, 2019 (Mar. 20, 2019), XPOS 1639626, 11 pgs.

Sikander Gulbadan et al.: "A Novel Machine Vision-Based 3D Facial Action Unit Identification for Fatigue Detection", IEEE Transactions On Intelligent Transportation Systems, IEEE, Piscataway, NJ, USA, vol. 22, No. 5, Feb. 25, 2020 (Feb. 25, 2020), pp. 2730-2740, XP011852938, ISSN: 1524-9050, DOI: 10.1109/TITS.2020.2974263.

Applicant: Matsuko s.r.o .; "Method, System, and Medium for Artificial Intelligence-Based Completion of a 3D Image During Electronic Communication"; U.S. Appl. No. 24/183,233; Extended European Search Report; dated Nov. 27, 2024; 11 pgs.

Cheng Shiyang, et al.; "Faster, Better and More Detailed: 3D Face Reconstruction with Graph Convolutional Networks"; Jan. 26, 2021 (Jan. 26, 2021); Springer, pp. 188-205, XP047577984.

* cited by examiner

METHOD, SYSTEM, AND MEDIUM FOR ARTIFICIAL INTELLIGENCE-BASED COMPLETION OF A 3D IMAGE DURING ELECTRONIC COMMUNICATION

CROSS-REFERENCE TO RELATED APPLICATION

The present application claims priority to U.S. provisional patent application No. 63/120,061 filed on Dec. 1, 2020, and entitled "Method, System, and Medium for Three-dimensional Electronic Communication", and is a continuation-in-part of U.S. patent application Ser. No. 17/538,664 filed on Nov. 30, 2021, and entitled "Method, System, and Medium for 3D or 2.5D Electronic Communication", the entireties of both of which are hereby incorporated by reference.

TECHNICAL FIELD

The present disclosure is directed at methods, systems, and techniques for artificial intelligence-based completion of a three-dimensional image during electronic communication.

BACKGROUND

Electronic communication between individuals is becoming increasingly popular and, in certain circumstances such as during a pandemic, necessary. While two-dimensional communication (e.g. videoconferencing) is commonplace, it fails to replicate the immersion and ease of in-person communication. Electronic communication that includes depth (e.g. 2.5D or 3D communication) can, in certain circumstances, represent an improvement over two-dimensional electronic communication.

SUMMARY

According to a first aspect, there is provided a method comprising: obtaining image data, head alignment data, and depth data of at least part of a three-dimensional head comprising a face of a conference participant, wherein at least the image data and head alignment data are determined based on two-dimensional or 2.5-dimensional images of the conference participant captured by a camera; reconstructing a photo-realistic three-dimensional representation of the at least part of the head from the image data, the head alignment data, and the depth data, wherein reconstructing the representation of the at least part of the head comprises reconstructing an area missing from the image data acquired by the camera, wherein reconstructing the representation comprises: projecting the image data from a world space into an object space using the head alignment data and depth data; and in the object space, completing at least part of the area missing from the image data using a computational model of a person, and wherein completing at least part of the area missing from the image data comprises applying an artificial neural network to reconstruct a texture and a depth of the at least part of the head.

The method may further comprise obtaining head segmentation data delineating separation of the head from background.

The method may further comprise encoding the head segmentation data as an alpha channel.

The method may further comprise: obtaining information defining at least one hole respectively representing at least one missing portion in the object space, wherein the information defining the at least one hole is obtained from the head segmentation data, depth data, and head alignment data; and encoding the information defining the at least one hole in the alpha channel.

The computational model may be specific to the conference participant.

The computational model may be generated from multiple persons.

The method may further comprise: identifying at least one of: frames of the image data that depict the head from an angle beyond an angle limit; and frames of the image data that depict parts of the face less than a face threshold; and removing the identified frames from the image data prior to the completing.

The method may further comprise obtaining a normals channel identifying respective normals for different points on the at least part of the head, and the artificial neural network may use the normals channel during completion.

The reconstructing may be performed based on the image data, the head alignment data, and the depth data retrieved from at least one video frame.

The reconstructed three-dimensional representation may be determined from a current image frame and a composition frame generated from multiple past image frames, wherein the multiple past image frames are sampled at a constant frequency.

The reconstructed three-dimensional representation may be determined from a current image frame and a composition frame generated from multiple past image frames, wherein the multiple past image frames are irregularly sampled.

The method may further comprise obtaining head alignment data of the conference participant, and the multiple past image frames may be sampled based on the head alignment data.

The method may further comprise, after the completing, smoothing or removing a back of the head.

The method may further comprise training the artificial neural network prior to the reconstructing, wherein the training comprises: capturing, using multiple cameras, multiple views of the face of the conference participant from different perspectives to obtain time-synchronized images comprising red, green, blue and depth channels; stitching the time-synchronized images together to generate three-dimensional training data comprising a complete version of the face of the conference participant; and training the artificial neural network using the training data.

The method may further comprise training the artificial neural network prior to the reconstructing, wherein the training comprises: capturing, using a single camera, multiple images of the face of the conference participant, wherein the multiple images are captured from different angles and show differential facial expressions of the conference participant; stitching the multiple images together to generate three-dimensional training data comprising a complete version of the face of the conference participant; and training the artificial neural network using the training data.

The method may further comprise training the artificial neural network prior to the reconstructing, wherein the training comprises: retrieving from storage a recording of a three-dimensional video comprising the face of the conference participant; stitching different frames of the recording together to generate three-dimensional training data comprising a complete version of the face of the conference participant; and training the artificial neural network using the training data.

According to another aspect, there is provided a system comprising: a network interface; a processor communicatively coupled to the network interface; and a non-transitory computer readable medium communicatively coupled to the processor and having stored thereon computer program code that is executable by the processor and that, when executed by the processor, causes the processor to perform the aforementioned method.

The system may further comprise a camera communicatively coupled to the processor, the camera for capturing an image of the conference participant.

The system may further comprise a display device communicatively coupled to the processor, and the method may further comprise displaying the reconstructed three-dimensional representation on the display.

According to another aspect, there is provided a non-transitory computer readable medium having encoded thereon computer program code that is executable by a processor and that, when executed by the processor, causes the processor to perform the aforementioned method.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Figure 1:
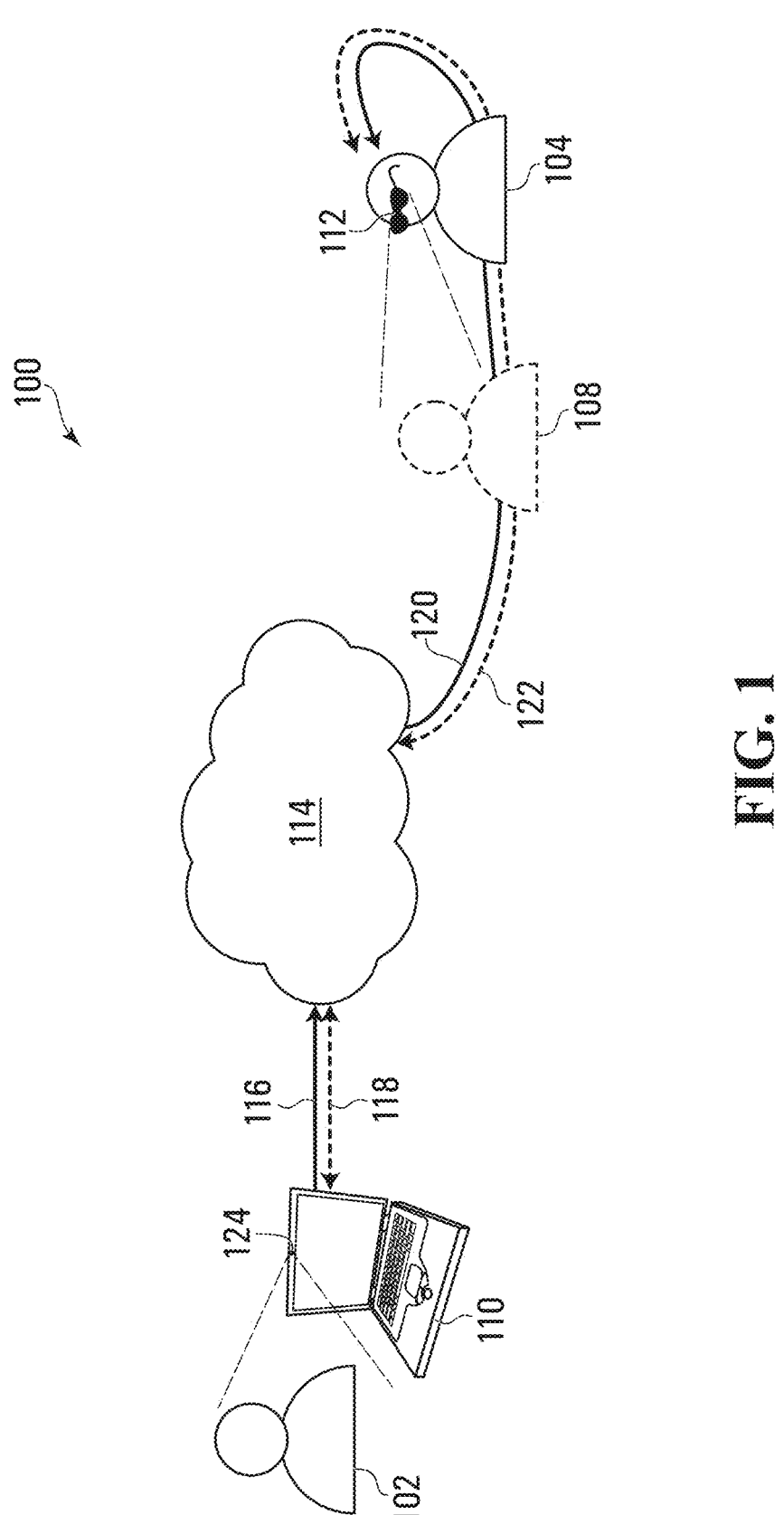
FIGS. 1 and 2 depict a system for three-dimensional electronic communication in which two parties are communicating with each other, according to an example embodiment.

Two-dimensional ("2D") communication, such as conventional videoconferencing, involves capturing a 2D video stream using a camera of a first conference participant, transmitting that data to a second conference participant, and then displaying that video stream on a display of the second conference participant. While an improvement over a phone conversation, 2D videoconferencing nonetheless falls well short of replicating the immersion and non-verbal communication possible during an in-person conversation. One way in which to improve upon 2D communication in this regard is to adopt communication that expresses depth: this may be 2.5-dimensional ("2.5D") or three-dimensional ("3D").

An example of conventional 3D communication is using 3D computer models in the form of animated avatars to represent conference participants. While suitable for certain applications, using animated 3D avatars for communication sidesteps the problem of attempting to replicate realistic, in-person communication by emphasizing the computer-animated nature of the avatars as a feature. Accordingly, the various problems associated with realistic 3D electronic communication, such as how to replicate at least part of a conference participant (e.g. at least that participant's face, and in certain circumstances at least that participant's head and upper body) in 3D and in real-time from non-3D data, are not addressed in avatar-based systems.

In contrast, in at least some of the embodiments described herein, 3D communication is performed by regenerating photo-realistic representations of conference participants. 2D or 2.5D image data resulting from a camera having imaged at least part of a 3D face of a conference participant is obtained. In at least some embodiments, more than the face may be imaged; for example, in addition to the face, part or all of the head and/or body (e.g. neck and upper torso) may also be imaged. One or more artificial neural networks, such as convolutional neural networks (each a "CNN"), are applied to process that image data and to output data enabling reconstruction of a photo-realistic, 2.5-dimensional or three-dimensional representation of at least the conference participant's face and, depending on the input data, in some embodiments also more of the participant's body more generally (e.g. the head, neck, and upper torso). The one or more neural networks' data output is at a rate permitting real-time reconstruction of the face. In various example embodiments, as described further below, the one or more neural networks may be used to perform eye area deocclusion, texture reconstruction, and reconstruction of portions of a conference participant's head not depicted in the 2D or 2.5D image data that the one or more neural networks process.

As used herein, the following terms have the following meanings:

2D Data: Data depicting a 2D image, such as a bitmap, JPEG, or PNG image. 2D data includes data depicting still images, and data comprising part of a video stream depicting multiple 2D images. 2D data may include raster and vector images.

2.5D Data: 2D data that includes a depth map. For example, while 2D data may comprise RGB channels, analogous 2.5D data would comprise RGBD channels. In at least some embodiments, a 3D image with one or more holes is a 2.5D image.

3D capable display device: A display device that can display a 3D object to a conference participant. Examples of 3D capable display devices comprise headsets; 3D televisions and monitors; holographic projectors; and a rendering or projection of 3D data on a classical 2D display.

3D Data: Data representing a 3D model. Examples of 3D data include voxels, depth map data, point-cloud data, and mesh data. 3D data includes data depicting a still 3D model, and a stream of data depicting a 3D model in motion. 3D data may be acquired, for example, using specialized 3D scanning hardware. Examples of suitable scanning hardware comprise "The Relightables" volumetric capture system by Google™ AI or the capture system used by Facebook™ Reality Labs. "Full-featured" 3D data of a body part herein refers to 3D data covering depicting the entirety of that body part, without gaps in the data. For example, full-featured 3D data of a person's head represents a 3D model of the head showing hair on the top of the head plus a 360 degree view around the front, sides, and back of the head.

Artificial neural network: Also referred to simply as a "neural network" herein, a type of data processing system that relies on machine learning to become suitably configured to perform a particular task. Neural networks are capable of performing massively parametric nonlinear extrapolation. Examples of neural networks that may be used in at least some of the embodiments herein are CNNs and multilayer perceptron ("MLP") neural networks.

Convolutional neural network, or CNN: A type of artificial neural network configured particularly for image processing.

Depth map: a representation of 3D data as a projection in a suitable coordinate space (e.g. Cartesian, cylindrical, or spherical) in which the 3D surface is encoded as the distances of points from a surface of the projection to a reference plane (e.g. a cylinder for a cylindrical projection, a sphere for a spherical projection, or an orthographic or perspective projection to a flat plane for Cartesian space).

Face landmarks: a vector of numbers representing one or more facial features, such as corners of eyes, the mouth, the nose, and analogous features.

Headset: Wearable glasses permitting display of 3D objects to a wearer. Example headsets comprise virtual reality ("VR"), augmented reality ("AR"), and mixed reality ("MR") headsets.

Hole in an image: an undefined part of a surface shown in an image, such as a 3D image (e.g. skin of the face) resulting from missing data when sampling, for example, a series of 2D or 2.5D images used to reconstruct the 3D image.

Object space: A coordinate space anchored to an object. In the object space, regardless of the motion of that object, a certain landmark on that object maintains the same coordinates. For example, if the object is a head of a person and the object space is anchored to that person's nose, then regardless of how that persons turns their head, the nose has the same object space coordinates.

Peer-to-peer ("P2P") communication: Communication between two endpoints in which data is not routed through a central server, but directly between the two endpoints.

Photo-realistic image: An image (whether 2D or 3D, and whether standalone or as part of a video) generated by data resulting from light captured on a sensor and displayed as a matrix of intensities of light and optionally color on particular locations in a raster, and images analogous thereto and/or resulting from a transformation thereof. In contrast to an avatar-based representation of a face in which only certain face landmarks are selected and mapped to an animated avatar, photo-realistic 3D video in at least some embodiments is generated not by using face landmarks as in an avatar-based approach, but from a transformation of 2D or 2.5D input video. For example, a 3D reconstruction of a head may be generated by transforming all 2D video of the head captured by a camera using an artificial neural network, as opposed to simply selecting certain facial landmarks on the head and mapping those facial landmarks to an avatar to morph the avatar.

Real-time video processing: Processing of an input video stream such that the output video stream resulting from the processing is provided at almost the same time as the input (e.g. a latency of no more than 500 ms) and at a suitable frame rate (e.g. at least 15 fps) as the input video stream.

RGB channels: The three different channels respectively used to represent a 2D image as a superposition of red, green, and blue matrices in which every entry in the matrix represents a pixel value in red, green, and blue.

RGBD channels: The four different channels respectively used to represent a 2.5D or 3D image in which RGB channels are combined with a depth channel that represents depth. Depth may be represented as a z-axis position when Cartesian coordinates are used. Alternatively, depth may be represented in any suitable alternative coordinate space, such as cylindrical or spherical, in which case the values for the RGB channels are correspondingly mapped to that coordinate space.

RGB voxels: A voxel that has red, green, and blue channels, thereby permitting the voxel to represent depth and texture.

Voxels: The 3D analogue to pixels. Voxels are used to represent 3D data in a raster format.

World space: A coordinate space that is fixed regardless of the motion of particular objects within it. For example, a world space may be shared by several call participants, while motion of various objects in the world space means the world space coordinates of those objects change.

Referring now to FIG. 1, there is depicted a system 100 for 3D electronic communication, according to an example embodiment. In at least some of the example embodiments described below, the type of 3D electronic communication is holographic communication, as is possible using certain types of headsets (e.g. Microsoft™ HoloLens™). In at least some other example embodiments, the type of 3D electronic communication may comprise, for example, displaying a 3D representation of one of the conference participants on to the 2D screen of another of the conference participants.

The system 100 of FIG. 1 is being used by a first conference participant 102 and a second conference participant 104. In FIG. 1, a first video acquisition device 110, such as a personal computer, comprising a camera 124 captures a 2D video stream of the first participant 102. The first video acquisition device 110 is networked to cloud infrastructure 114, comprising one or more servers. The cloud infrastructure 114 receives the 2D video stream from the first video acquisition device 110 and applies an artificial neural network to process it such that the artificial neural network outputs data enabling reconstruction of a photo-realistic, 2.5-dimensional or three-dimensional representation of the first participant's 102 head. In particular, the artificial neural network reconstructs the portions of the first participant's 102 head not depicted in the 2D image data captured by the camera 124 on the first video acquisition device 110 in 3D. For example, the artificial neural network in at least some example embodiments outputs data enabling reconstruction of a 360 degree view of the first participant's 102 head, even if the camera 124 only captures a front elevation view of the first participant's 102 face. In at least some example embodiments the system 100 may also image other parts of the first participant's 102 head (e.g. the sides, back, and/or top of the head), and other parts of the first participant's 102 body (e.g. the neck and shoulders).

The output of the artificial neural network is sent to the first display device 112; in FIG. 1, the first display device 112 is a headset worn by the second participant 104. The first display device 112 receives the data output of the artificial neural network from the cloud infrastructure 114 and projects a holographic projection 108 of the first participant 102 for viewing by the second participant 104.

Communication between the first video acquisition device 110 and the cloud infrastructure 114 is performed via the first video data stream 116 and the first management data stream 118, while communication between the cloud infrastructure 114 and the first display device 112 is analogously performed via the second data stream 120 and the second management data stream 122. The contents of the various data streams 116, 118, 120, 122 are described further below.

Each of the first video acquisition device 110, first display device 112, and one or more servers comprising the cloud infrastructure 114, comprises at least one processor communicatively coupled to a computer memory that has stored on it computer program code executable by that at least one processor such that, when that at least one processor executes that computer program code, the system 100 collectively performs the functionality described herein. This implementation includes, for example, execution by a neural or artificial intelligence accelerator. More particularly, the system 100 collectively implements the actions and subsystems described below.

The first video acquisition device 110 comprises an input processing subsystem, which itself comprises a data access subsystem, a preprocessing subsystem, and a stream sender subsystem. The data access subsystem reads the 2D video stream from the camera 124 and relays the 2D video stream to the preprocessing subsystem. The preprocessing subsystem re-scales, synchronizes, and de-noises the 2D video stream. The stream sender subsystem forms the first video data stream 116 and sends the first video data stream 116 to the cloud infrastructure 114.

The first video data stream 116 comprises the following channels:

an audio channel, comprising sound data obtained using the first computer's 110 microphone;

a video channel, comprising the 2D video stream; and a metadata channel, comprising additional data related to the electronic communication such as head position and head rotation data, and gaze direction and eye blink data that the cloud infrastructure 114 uses for, among other things, gaze reconstruction of the first participant 102.

In at least some other embodiments in which the first video acquisition device 110 also captures depth data (e.g. using a depth sensor or stereo camera), the first video data stream 116 may also comprise a depth data channel for transmitting that depth data. More generally herein, 2D video data may be replaced with 2.5D video data unless otherwise indicated to create additional embodiments.

While the first video data stream 116 comprises substantive content used to create the holographic projection 108, the first management data stream 118 is used for call management communications. For example, data comprising part of the first management data stream 118 is used to negotiate, initiate, and end the communication, and also for setup and synchronization purposes.

The cloud infrastructure 114 performs various actions on the first and second data streams 116, 118. More particularly, the cloud infrastructure 114 receives the first and second data streams 116, 118; performs call management, including authentication and configuration of the call; performs 2D-to-3D (or 2.5D-to-3D, as referenced above) reconstruction of the first participant 102; performs texture reconstruction; performs eye area deocclusion; performs 3D processing of meshes and voxels; and outputs the data suitable for 3D displaying of the first participant 102 ("3D data") to the first display device 112. The cloud infrastructure 114 performs these actions with various subsystems, as described below and as depicted in FIGS. 6A and 6B.

Figure 6A:
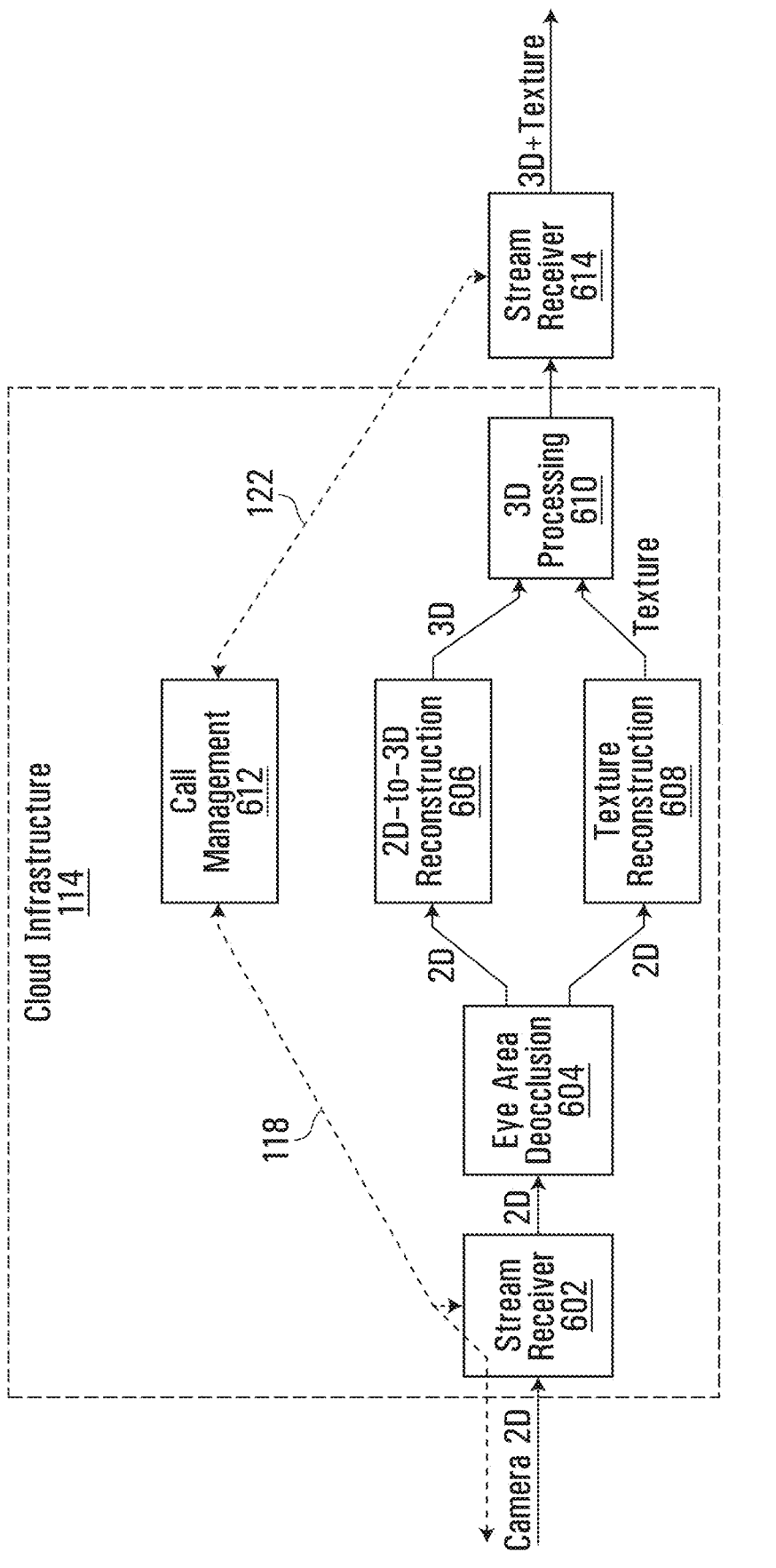
FIGS. 6A and 6B each depicts a block diagram of cloud infrastructure comprising part of the system of FIGS. 1 to 3, communicative with a stream receiver subsystem on a display device, according to additional example embodiments.

More particularly, in FIG. 6A, a stream receiver subsystem 602 receives the 2D video data from the first video data stream 116 and outputs that 2D video data to an eye area deocclusion subsystem 604. The eye area deocclusion subsystem 604 sends 2D video data in parallel to a 2D-to-3D reconstruction subsystem 606 and to a texture reconstruction subsystem 608. The 2D-to-3D reconstruction subsystem 606 outputs 3D data, and the texture reconstruction subsystem 608 outputs texture data in 2D, and both the texture data and 3D data are sent to a 3D processing subsystem 610. The 3D processing subsystem 610 sends 3D and texture data, together with related data as discussed below, to a stream receiver subsystem 614 on the first display device 112. The cloud infrastructure 114 also comprises a call management subsystem 612 that transmits and receives the first management data stream 118 and the second management data stream 122 respectively between the stream receiver subsystem 602 of the cloud infrastructure 114 and the stream receiver subsystem 614 of the first display device 112. Each of the eye area deocclusion subsystem 604, 2D-to-3D reconstruction subsystem 606, and texture reconstruction subsystem 608 is implemented using its own artificial neural network in FIG. 6A.

Figure 6B:
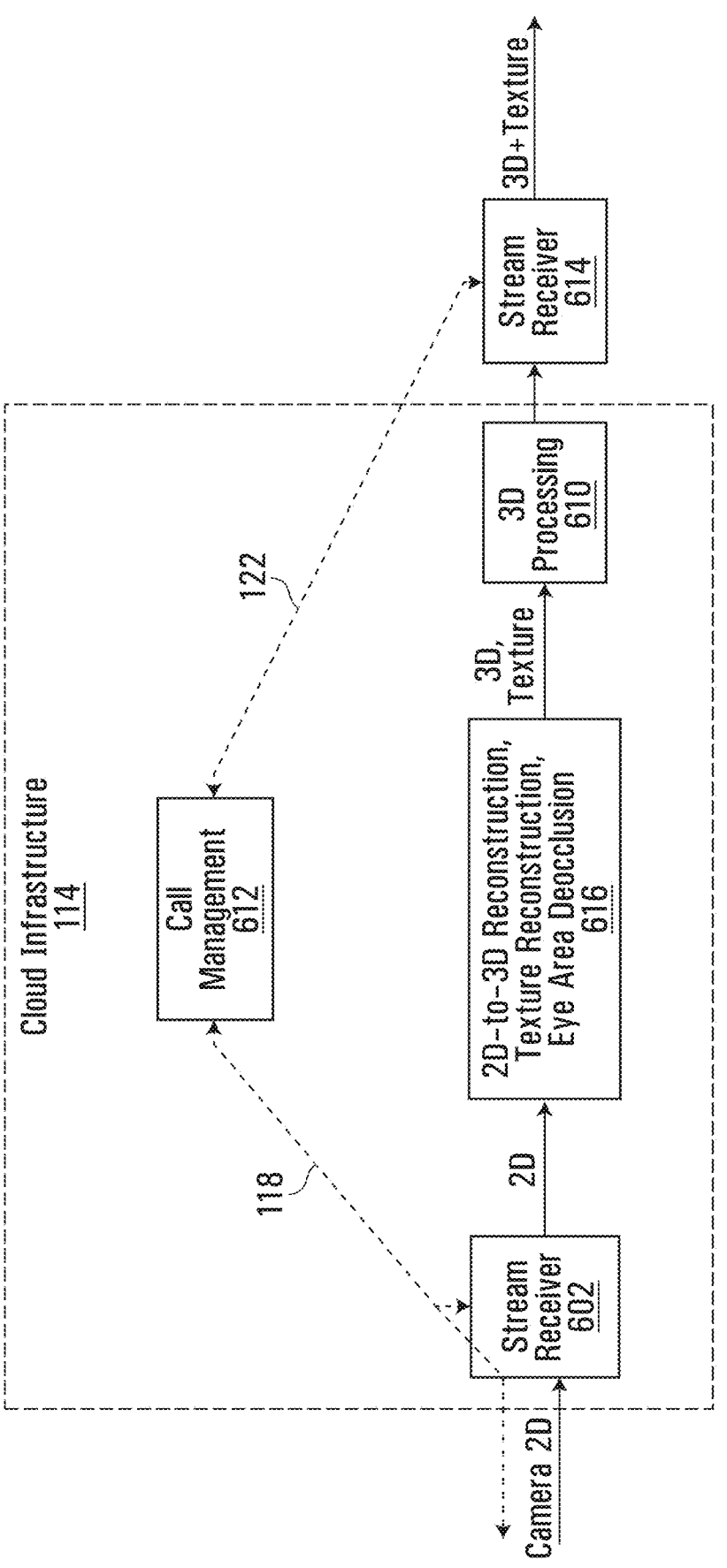

In another embodiment of the cloud infrastructure 114 as shown in FIG. 6B, the stream receiver subsystem 602 receives the 2D video data from the first video data stream and outputs that 2D video data to an integrated subsystem 616 that performs the functionality of the 2D-to-3D reconstruction subsystem 606, texture reconstruction subsystem 608, and eye area deocclusion subsystem 604 as described above. In contrast to the embodiment of FIG. 6A, this integrated subsystem may be implemented using a single artificial neural network. The integrated subsystem 616 outputs textured, 3D data to the 3D processing subsystem 610, which sends that data to the stream receiver subsystem 614 on the first display device 112 as in FIG. 6A. Also as in FIG. 6A, the call management subsystem 612 of the cloud infrastructure 114 handles call management by communicating the management data streams 118, 122 with the stream receiver subsystems 602, 614.

The functionality of the various subsystems 602, 604, 606, 608, 610, 612, 616 is discussed further below.

The call management subsystem 612 is responsible for initiating the call between the participants 102, 104. In contrast with 2D video conferencing, the call management subsystem 612 manages the position of the first conference participant 102 in a 3D virtual embodiment 318 (shown in FIG. 3) into which the first display device 112 projects the holographic projection 108.

The stream receiver subsystem 602 is responsible for receiving the data streams 116, 118 from the first video acquisition device 110.

The 2D-to-3D reconstruction subsystem 606 may comprise a CNN that is trained to output data enabling reconstruction of a 3D representation of the first participant 102 from the 2D or 2.5D video stream using volumetric regression. More particularly, the CNN is trained to reconstruct the 3D data that is missing from the 2D or 2.5D input. In at least some example embodiments, the CNN is based on that described in Aaron S. Jackson, Adrian Bulat, Vasileios Argyriou, and Georgios Tzimiropoulos, "Large Pose 3D Face Reconstruction from a Single Image via Direct Volumetric CNN Regression", arXiv:1703.07834v2 [cs.CV], 8

Sep. 2017 ("Jackson"), the entirety of which is hereby incorporated by reference. The CNN performs a direction-aligned transformation of the 2D raster of pixels received from the first video acquisition device 110 into a 3D space (e.g. a raster of voxels or depth map).

In at least some example embodiments, the CNN of Jackson may be modified to perform 3D convolutions. For a 3D convolution, multiple 2D input channels of data are merged into a single 3D object, and a convolution is performed on that object. For example, three 256×256 RGB channels can be merged into a single RRGGBB 256×256×6 object. The 2D video stream data (e.g. the RGB channels) may be converted into the 3D data stream, and that 3D data stream may be the input to the CNN. The CNN then performs 3D convolutions on that 3D data (e.g. 3×3×3 convolutions). In at least some other example embodiments, multiple layers of 2D feature maps may be obtained from parallel 2D convolution branches within the CNN (e.g. seven 64-channel 58×58 branches). These branches are merged into a single 3D layer (e.g. a single 64-channel 58×58×7 layer) that can be further processed with 3D convolutions (e.g. 3×3×3 convolutions). Applying 3D convolutions in this manner enables better reconstruction of the 3D representation of the first participant's 102 face on the output from the CNN.

Additionally, in at least some example embodiments the CNN used may be based on an Alexnet CNN, plain RES-net CNN, or U-net CNN, as respectively described in Alex Krizhevsky, Ilya Sutskever, and Geoffrey E. Hinton, "ImageNet Classification with Deep Convolutional Neural Networks", NIPS '12: Proceedings of the 25th International Conference on Neural Information Processing Systems—Volume 1, December 2012, pp. 1097-1105; Kaiming He, Xiangyu Zhang, Shaoqing Ren, and Jian Sun, "Deep Residual Learning for Image Recognition", arXiv: 1512.03385v1 [cs.CV], 10 Dec. 2015; and Olaf Ronneberger, Philipp Fischer, and Thomas Brox, "U-Net: Convolutional Networks for Biomedical Image Segmentation", arXiv:1505.04597v1 [cs.CV], 18 May 2015, the entireties of all of which are hereby incorporated by reference. These CNNs are simpler than that described in Jackson, permitting faster inference rates while preserving quality of transformation in certain embodiments.

In at least some other example embodiments, the CNN is based on Phillip Isola, Jun-Yan Zhu, Tinghui Zhou, and Alexei A. Efros, "Image-to-Image Translation with Conditional Adversarial Networks", arXiv:1611.07004v3 [cs.CV], 26 Nov. 2018 ("Isola"), the entirety of which is hereby incorporated by reference. In these example embodiments, the CNN of Isola is modified by adding a depth map channel to the RGB channels of the 2D video stream that are input to the CNN. The depth channel is aligned with the RGB channels; in other words, each of the red, green, blue, and depth channels are of the same field of view. The RGB data is transformed into a 3D texture space, such as cylindrical coordinates, spherical coordinates, and/or Cartesian coordinates, in which depth is represented for the whole visible portion (e.g. head, or the head and a top part of the torso) of the first participant 102 being imaged. Different coordinate spaces may be used for various parts of the body; for example, spherical coordinates may be used for a participant's head outside of the face, cylindrical coordinates may be used for a person's upper torso, and Cartesian coordinates may be used for the front of the person's face. While the CNN of Isola is a generative adversarial network ("GAN"), in these example embodiments it is performing a supervised-mode task, and accordingly can be simplified to a simpler type of supervised network, including by downscaling its architecture to Alexnet or plain RES-net. In at least some example embodiments, GAN-mode operation may be mixed with supervised-mode operation in a single network by weighting GAN-mode and supervised-mode contributions (e.g. when the discriminator-contribution is weighted at zero, the entire CNN behaves as a supervised-mode network).

In at least some example embodiments, the texture reconstruction subsystem 608 reconstructs color information for portions of the holographic projection 108 that are not depicted in the 2D data in the first video data stream 116. The artificial neural network used for texture reconstruction may be based on the CNN described in Isola. The CNN receives as input the 2D image data from the camera 124 and outputs data representing 2D color texture for the coloring of the 3D volume output by the 2D-to-3D reconstruction subsystem 606. The output of texture reconstruction subsystem 608 is given in suitable coordinates, such as cylindrical, spherical, or another suitable 3D texture space to enable the first display device 112 to generate the holographic projection 108. As described above, while in FIG. 6A the texture reconstruction subsystem 608 and 2D-to-3D reconstruction subsystem 606 are separate artificial neural networks, in FIG. 6B the CNN described in Isola is used for 3D reconstruction, the same CNN can be used to concurrently perform texture reconstruction resulting in the integrated subsystem 616.

In at least some different example embodiments, the CNN of Jackson may be analogously used to concurrently perform 3D reconstruction and texture reconstruction. For example, the CNN of Jackson may be trained to output data in the form of voxels that not only represent whether a voxel is part of the 3D reconstructed face or not, but also RGB values for that voxel to represent that voxel's color. In at least some embodiments, all reconstructed voxels (e.g. voxels representing head and torso) comprise RGB values; in at least some other example embodiments, only a portion of the reconstructed voxels (e.g. voxels for the surface of the holographic projection's 108 head) also comprise the color information.

In at least some other embodiments, different types of artificial neural networks may be used for 3D reconstruction and texture reconstruction. For example, the CNN of Isola may be used for 3D reconstruction (as a depth map reconstruction), and the CNN of Jackson may be used for texture reconstruction (as an RGB voxels reconstruction).

In at least some example embodiments, the camera 124 may comprise a depth sensor that generates 2.5D images of the first participant 102 in RGBD format. This depth data allows a cylindrical projection, or hybrid flat and cylindrical projection, of the image represented by the 2D RGB channels into the object space, which allows for better 3D reconstruction of parts of the face not depicted in the 2D image.

More particularly, transforming the face of the first participant 102 into the object space helps to ensure a fixed and centered frontal view of all input images in the training data set for the artificial neural network, allowing for smaller and faster artificial neural networks than when training is performed using uncentered images from the world space. For example, in at least some example embodiments the fixed and centered frontal view in the object space permits volumetric reconstruction without using an artificial neural network by direct filling of areas missing in the 2D image captured by the camera 124 with corresponding areas from complete 3D reference models of the first participant 102 obtained in advance. For example, missing volumes in a 2D image of the first participant's 102 face may be filled using samples taken from corresponding areas of complete 3D reference models. This is feasible because the 3D contours of a person's head does not change significantly during a call; rather, facial expressions and changes in lighting can result in significant changes of texture.

Figures 7A, 7B, 7C, 7D:
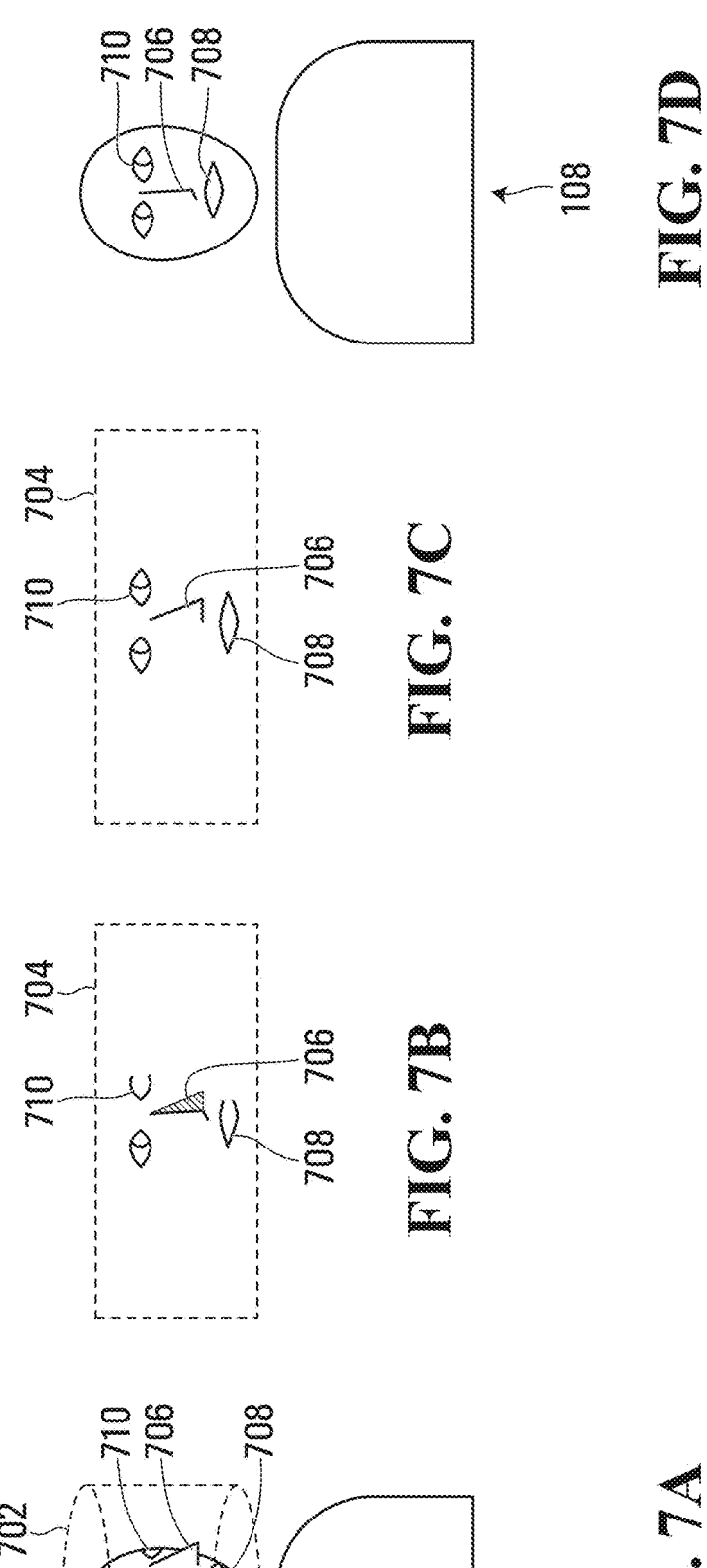
FIGS. 7A-7D and 8 represent texture reconstruction being performed on a conference participant using the system of FIGS. 1 to 3 according to additional example embodiments.

FIGS. 7A-7D depict a combined 2D-to-3D and texture reconstruction, in which the reconstruction comprises a transformation to the object space, being performed on the first participant's 102 face using the integrated subsystem 616, according to an example embodiment. FIG. 7A depicts the first participant 102 as seen by the camera 124 in the world space prior to any reconstruction. The first participant's 102 head is rotated such that only the right side of the first participant's 102 nose 706, mouth 708, and left eye 710 are visible to the camera 124. Without 3D and texture reconstruction, the second participant 104 would accordingly not see the left side of the first participant's 102 nose 706, mouth 708, or left eye 710 in their holographic projection 108 (i.e. were the second participant 104 to move their head to attempt to look at the left side of the nose 706, mouth 708, or left eye 710 without reconstruction there would be nothing there).

The preprocessing subsystem on the first video acquisition device 110 obtains the 2D (or 2.5D) image and cylindrically projects it on to a virtual cylinder 702 surrounding the first participant's 102 head in the world space. The result of this projection is shown in FIG. 7B, which shows the projected face in an object space 704. As only the right side of the nose 706 was captured by the camera 124, the projection of FIG. 7B correspondingly only shows the right side of the nose 706. Similarly, as only the right side of the left eye 710 and right side of the mouth 708 are captured by the camera 124, the left side of the left eye 710 and left side of the mouth 708 are not visible in FIG. 7B. The areas of the face hidden from the camera 124 in FIG. 7A are present in FIG. 7B but undefined.

In at least some example embodiments, the 2D projection of FIG. 7B serves as an input to one or more artificial neural networks for 2D-to-3D reconstruction and texture reconstruction. In order to fill the missing areas of the projection, coordinates defining those missing areas can be fed into one or more artificial neural networks as an additional channel alongside the RGB channels, for example, of the 2D projection. Alternatively, the RGB channels without the additional channel may be an input to the artificial neural network for texture reconstruction; for example, the missing areas in the RGB channels may be colored a suitable color (e.g. black or gray) and used as an input to the artificial neural network. For texture reconstruction, the artificial neural network may be trained to perform texture reconstruction using inpainting. The projection may be an input to the integrated subsystem 616 of FIG. 6B, or copies of the projection may respectively be an input to the 2D-to-3D reconstruction subsystem 606 and texture reconstruction subsystem 608 of FIG. 6A. As another example, any hidden areas of the 2D projection may have a 3D reconstruction performed with corresponding areas from a 3D reference model of the first participant 102, as discussed above; this may be done without an artificial neural network. Regardless, following reconstruction the image of FIG. 7C is obtained. In FIG. 7C, the left side of the nose 706, left side of the mouth 708, and left side of the left eye 710 have had their volume and texture reconstructed and appear in full. Following processing by the 3D processing subsystem 610, the resulting 3D data depicts a 3D model with the reconstructed left side of the nose 706, left side of the left eye 710, and left side of the mouth 708 visible as shown in FIG. 7D.

The eye area deocclusion subsystem 604 performs eye area deocclusion when the 2D video data captured by the camera 124 excludes the eyes of the first participant 102. For example, the first participant 102 may be wearing a headset (not shown in FIG. 1, and shown in FIGS. 2 and 3 as the second display device 214), which hides the first participant's 102 eyes and the area of the participant's 102 face surrounding the eyes (collectively, the "eye area") from the camera 124. As described above, the eye area deocclusion subsystem 604 may comprise its own artificial neural network upstream of the 2D-to-3D reconstruction subsystem and texture reconstruction subsystem 608, or may be part of the integrated subsystem 616.

In at least some example embodiments, the data input to the eye area deocclusion subsystem 604 may further comprise metadata comprising gaze direction information, which may be obtained, for example, using a front camera of a phone or a camera on a headset positioned to record gaze. In these example embodiments, the eye area deocclusion subsystem 604 may adjust the gaze of the eyes in the reconstructed eye area accordingly.

Regardless of the particular artificial neural network implementation, training of the 2D-to-3D reconstruction subsystem 606 uses data sets comprising good quality pairs of 2D photos of individuals and aligned 3D scans of them taken concurrently as training pairs; the artificial neural network is then trained using supervised learning. For example, the 2D photos and 3D scans are taken within a sufficiently close time together such that the individuals are in substantially identical poses in both the photos and scans (e.g. less than 100 ms apart); are not overly noisy; depict the individuals in all lighting conditions in which the first participant 102 is expected to be seen; and depict the individuals showing all the various facial expressions that the first participant 102 is expected to express. In at least some example embodiments, training is performed using 2D and 3D training video pairs as opposed to static image pairs. An example training data set comprising video session pairs may comprise several pairs of video sessions per individual, using a reasonable number (e.g. hundreds or thousands) of people. The different video pairs comprising the training data set represent different scenarios covering the various emotions, poses, movements, and lighting that the first participant 102 is expected to be seen in when the system 100 is in use.

For example, training data may be obtained by a multiview scanner in which time-synchronized cameras concurrently record RGB or RGBD images of an individual's head from multiple angles, which images are then stitched together to form a 3D image of the individual's entire head without any holes or gaps in the 3D image. This stitching may be done, for example, using 3D modelling as described in Mildenhall, B. et al., NeRF: Representing Scenes as Neural Radiance Fields for View Synthesis, arXiv: 2003.08934 [cs.CV], the entirety of which is hereby incorporated by reference herein. From that 3D image, training image pairs for neural network training are obtained, which may be used to train one or more neural networks to perform texture and depth completion in an image (or images) with and without holes. For example, when training a network to perform texture completion, a training image pair may comprise a 2D/2.5D image comprising the texture with holes, and a corresponding 3D image of the texture without holes. The holes may result from a 3D reconstruction based on 2D or 2.5D images. Alternatively, both training image pairs may be 3D images, and the holes may be generated in one of the training image pairs by changing the viewing angle of a 3D image to an angle where data is missing and a hole is consequently present.

As another example, training data may be obtained by having an individual record a video (e.g. in RGB or RGBD) of themselves using a single camera, with the different views comprising part of the video being respectively obtained from multiple angles and/or with the individual showing different facial expressions. The videos are then stitched together and/or 3D volumetric modelling is used to create a 3D image without any holes or gaps. This stitching may be done, for example, using 3D modelling as described in Mildenhall, B. et al., NeRF: Representing Scenes as Neural Radiance Fields for View Synthesis, arXiv:2003.08934 [cs.CV]. The individual may record videos using a stand-alone camera apart from the system 100; alternatively or additionally, videos captured by the first video acquisition device 110 when the individual was using the system 100 may be used to generate training data. As an alternative to videos, individual images may be used in at least some embodiments.

Artificial neural network training is done for 2D-to-3D reconstruction or 2.5D-to-3D reconstruction, depending on what type of input data is to be used in conjunction with the artificial neural network, to enable the artificial neural network to function using 2D or 2.5D input data. For 2D-to-3D reconstruction with RGB input, the RGB channels are input to the artificial neural network for reconstruction. For 2.5D-to-3D reconstruction with RGBD input, the RGBD channels are input to the artificial neural network for reconstruction. The cloud infrastructure 114 may comprise one or more artificial neural networks trained to perform 2D-to-3D reconstruction using RGB input data, and another one or more artificial neural networks trained to perform 2.5D-to-3D reconstruction using RGBD input data. The cloud infrastructure 114 may receive the RGB input data and the RGBD input data from different computers or from the first video acquisition device 110 at different times.

In at least some example embodiments in which the system 100 comprises the eye area deocclusion subsystem 604, the data used for artificial neural network training is customized to enable the artificial neural network to perform eye area deocclusion. For example, an artificial neural network for performing eye area deocclusion can be trained using supervised learning in which an input and output training image pair respectively comprise a 2D or 2.5D image of a person with the eye area occluded (e.g. masked out with a rectangular mask) and the corresponding unoccluded 2D or 2.5D image. For the embodiment of FIG. 6A in which eye area deocclusion is performed prior to texture reconstruction and 3D reconstruction, the training image pairs may comprise 2D or 2.5D images. For the embodiment of FIG. 6B in which eye area deocclusion is performed concurrently with texture reconstruction and 3D reconstruction, the training image pairs may comprise a 2D or 2.5D image as input and a 3D reconstruction as output.

In at least some example embodiments, training the artificial neural network used to implement the texture reconstruction subsystem 608 is performed using image pairs in which the image of the pair representing input is a 2D RGB image, and the image of the pair representing output is a 2D image in an appropriate projection (e.g. cylindrical or spherical).

The 3D processing subsystem 610 maps the outputs of the artificial neural networks described above from voxels or a depth map representation to a representation compatible with the first display device 112. Example suitable representations comprise a mesh presentation, a point-cloud representation, and a depth map representation. In the embodiment of FIG. 6A, the 3D processing subsystem 610 receives inputs separately from the 2D-to-3D reconstruction subsystem 606 and the texture reconstruction subsystem 608, and accordingly aligns those inputs with each other. For example, alignment between the 3D data output by the 2D-to-3D reconstruction subsystem 606 and the 2D data output by the texture reconstruction subsystem 608 may be aligned by ensuring proper alignment of one or more facial landmarks, such as the nose.

The output of the 3D processing subsystem 610 is sent to the first display device 112 as the second data stream 120. The second data stream 120 comprises the following channels:

an audio channel;

a volumetric data channel, comprising full-featured 3D data or reconstructed 2.5D data in a suitable format for the first display device 112, such as a mesh representation, point-cloud representation, or depth map representation as discussed above;

a color texture channel, comprising texture data to be applied on to the volumetric data contained in the volumetric data channel; and a metadata channel, comprising information describing head position and angle of rotation, spatial position data, gaze direction, and facial landmarks of the first participant 102.

The first display device 112 receives the second data stream 120 and processes it using the stream receiver subsystem 614, a 3D and texture processing subsystem, and a display subsystem. The stream receiver subsystem 614 collects the second data and management data streams 120, 122 from the cloud infrastructure 114; the 3D and texture processing subsystem performs any final corrections or transformations of the 3D image data received from the cloud infrastructure 114 into a format suitable for display by the first display device 112; and the display subsystem loads the 3D and texture data and projects the holographic projection 108 for the second participant 104.

Using the system 100 of FIG. 1, the holographic projection 108 is in at least some example embodiments updated in real-time and photo-realistic. Real-time presentation is achieved by using efficient eye area deocclusion, 2D-to-3D reconstruction, texture reconstruction, and 3D processing, and/or integrated subsystems 604, 606, 608, 610, and 616 with low latency (e.g. a cumulative latency of no more than 500 ms), high throughput (e.g. a frame rate of at least 15 fps at a resolution of 256×256×256 or higher), and sufficiently powerful hardware (e.g. an Apple™ Neural Engine™ in the case of the first video acquisition device 110, or an array of parallelized GPUs in the case of the cloud infrastructure 114). Furthermore, efficient data formats (e.g. H.264 or VP9 for 2D data), resolutions (e.g. at least 640×480 for 2D data, and at least 256×256×256 for 3D data), and streaming methods (e.g. in accordance with the WebRTC™ project) also contribute to real-time presentation of the holographic projection 108. Photo-realism is facilitated by using a 2D or 2.5D-to-3D reconstruction method based on translating pixels to voxels or a depth map as opposed to an avatar-based approach in which facial expressions are represented as feature vectors of using selected face landmarks.

Generating a 3D reconstruction in respect of FIG. 1 generally comprises capturing a 2D or 2.5D image as a raster using the first video acquisition device 110, performing raster-to-raster corrections and transformations (e.g. transforming between the world space and object space, from 2D to 3D, from voxels to point-cloud, from a 2D image lacking texture to a 2D image comprising texture) in the first video acquisition device's 110 preprocessing subsystem, the cloud infrastructure 114, and the first display device's 112 3D and texture processing subsystem, and displaying the raster as the holographic projection 108. In contrast to an avatar-based approach in which face landmarks of a selected portion of a 2D or 2.5D image are transferred to a pre-existing avatar and used to morph the avatar, the transfor-mation as contemplated in at least some embodiments uses all the image data in the selected part(s) of a 2D or 2.5D image in a transformation that reconstructs a 3D object.

Figure 2:
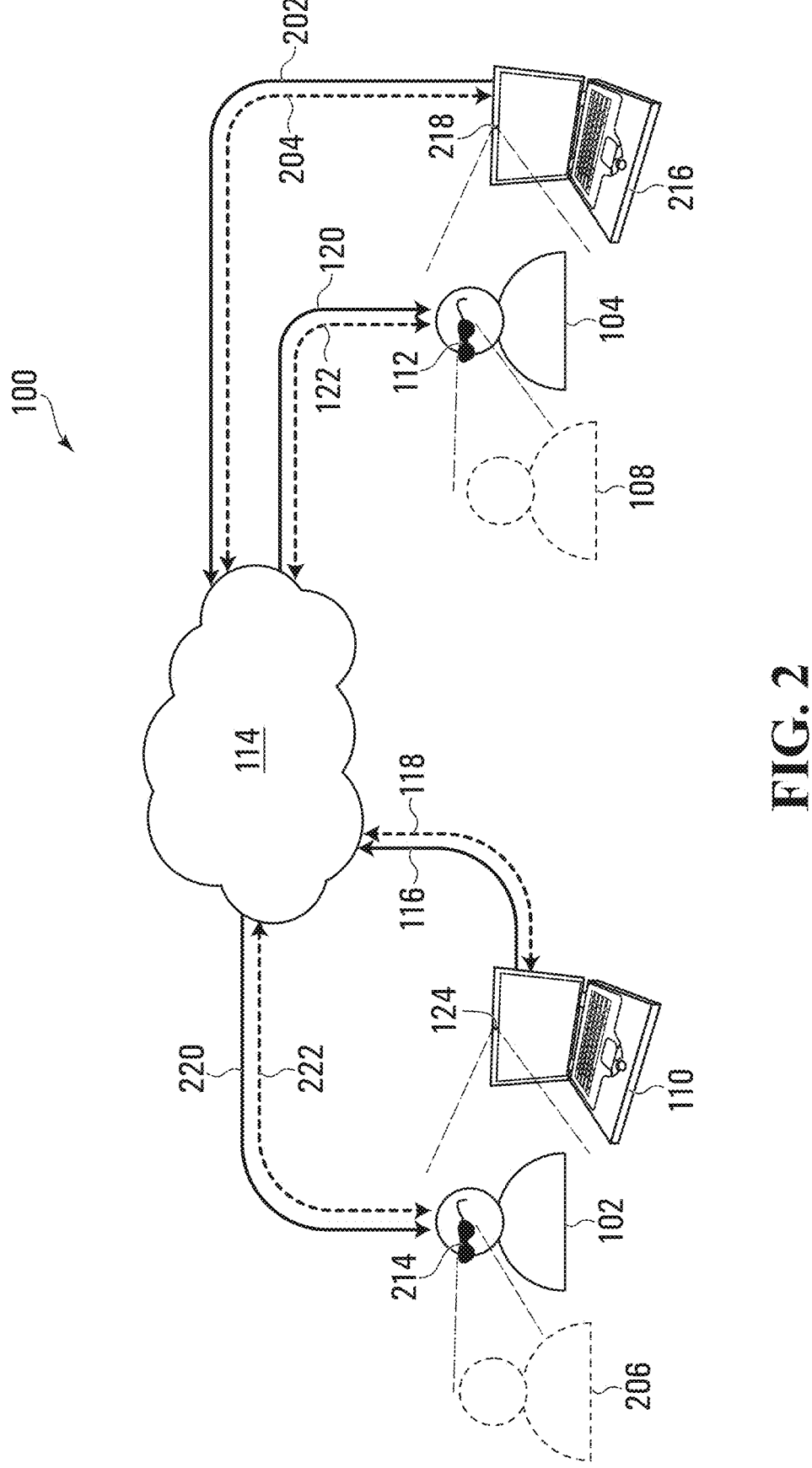

Referring now to FIG. 2, another example embodiment of the system 100 for 3D electronic communication is depicted. While the system 100 of FIG. 1 permits one-way holo-graphic communication from the first participant 102 to the second participant 104, the system 100 of FIG. 2 permits bi-directional holographic communication. While the sys-tem 100 of FIG. 1 implements a "one way" call from the first participant 102 to the second participant 104, the system 100 of FIG. 2 accordingly performs bi-directional electronic communication by implementing two one-way calls in par-allel with each other. This is done by essentially duplicating the equipment used for the one way call of FIG. 1, thereby enabling the first participant 102 to view a holographic projection 206 of the second participant 104.

More particularly, relative to FIG. 1, the system 100 of FIG. 2 further comprises a second video acquisition device 216 comprising a second camera 218, which captures 2D images of the second participant 104. Analogous to the first video acquisition device 110, the second video acquisition device 216 also comprises a data access subsystem, a preprocessing subsystem, and a stream sender subsystem. The second video acquisition device 216 transmits to the cloud infrastructure a third video data stream 202, analogous to the first video data stream 116 sent by the first video acquisition device 110, and bi-directionally communicates with the call management subsystem 612 of the cloud infrastructure 114 using a third management data stream 204 that is analogous to the first management data stream 118 sent and received by the first video acquisition device 110.

The system 100 of FIG. 2 also comprises a second display device 214 worn by the first conference participant 102, with the second display device 214 projecting the holographic projection 206 of the second participant 104. The cloud infrastructure 114 transmits a third data stream 220, analo-gous to the second data stream 120, to the second display device 214. A third management data stream 222, analogous to the second management data stream 122, between the cloud infrastructure 114 and the second display device 214 is used for call management.

Figure 3:
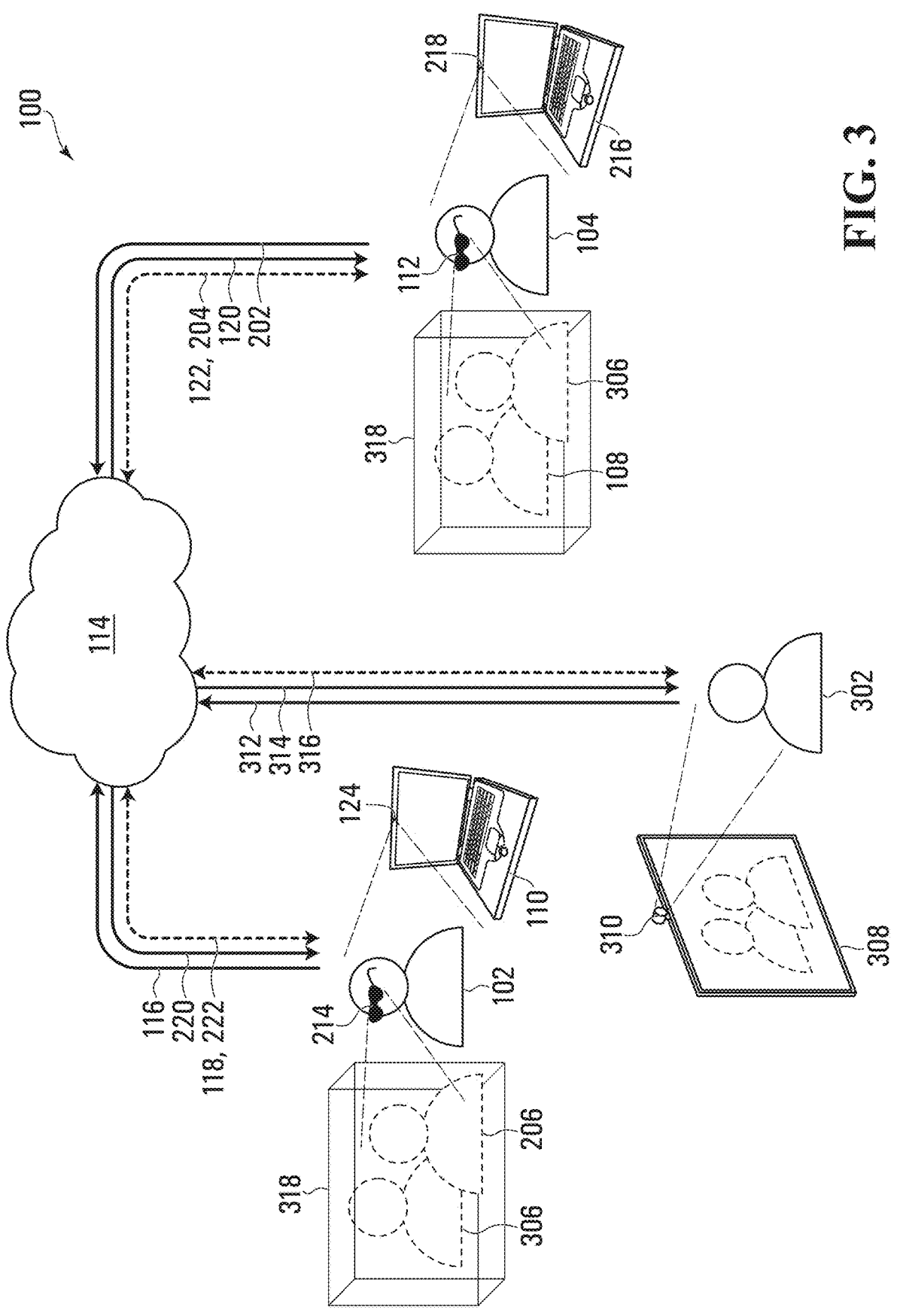
FIG. 3 depicts a system for three-dimensional electronic communication in which three parties are communicating with each other, according to another example embodiment.

FIG. 3 depicts another embodiment of the system 100 for 3D electronic communication in which a third conference participant 302 holographically conferences with the first and second participants 102, 104. Analogous to how the system 100 of FIG. 2 permits two-way communication by doubling the equipment used to implement the system 100 of FIG. 1, the system 100 of FIG. 3 enables three-way communication by tripling the equipment in the system 100 of FIG. 1. Relative to the system 100 of FIG. 2, the system 100 of FIG. 3 accordingly further comprises a third video acquisition device comprising a third camera 310 that cap-tures a 2D video stream of the third participant 302. The third camera 310 transmits a fourth video data stream 312 to the cloud infrastructure 114 and receives a fourth manage-ment data stream 316 from the cloud infrastructure 114. The fourth video data stream 312 is analogous to the first and third video data streams 116, 202, and accordingly permits each of the first and second participants 102, 104 to view a holographic projection 306 of the third participant 302. The fifth data stream 314 is analogous to the second and third data streams 120, 220, and accordingly sends textured, 3D data to a third display device 308 in the form of a television that enables the third participant 302 to view 2.5D repre-sentations of the first and second participants 102, 104 on a screen. A fourth management data stream 316 collectively represents bi-directional data streams between each of the third video camera 310 and third display device 308 and the cloud infrastructure 114 for call management, and is analo-gous to the first and third management data streams 118, 222 in respect of the first participant 102 and to the second and third management data streams 122, 204 in respect of the second participant 104.

In contrast to the embodiments of FIGS. 1 and 2, in FIG. 3 each of the first and second participants 102, 104 views two of the holographic projections 108, 206, 306, while the third participant 302 views 2.5D representations based on 3D models of the first and second participants 102, 104. Consequently, the call management data also comprises spatial positioning of each of the projections 108, 206, 306 within the 3D virtual environments 318 of the first and second display devices 112, 214 and the representation of the 3D virtual environment 318 displayed on the third display device 308. The call management subsystem 612 in the cloud infrastructure 114 maintains relative 3D position-ing between the holographic projections 108, 206, 306 for each of the 3D virtual environments 318 of the first and second display devices 112, 214 and the representation of the 3D virtual environment 318 displayed on the third display device 308, and transmits that positioning to each of the first through third display devices 112, 214, 308 for their use during holographic projection (for the first and second display devices 112, 214) and 2.5D representation (for the third display device 308). A conference of more than the three participants 102, 104, 304 may be organized analo-gously as shown in FIG. 3. More particularly, each of the fourth and subsequent participants may be treated analo-gously as any of the first through third participants 102, 104, 302.

Figure 4:
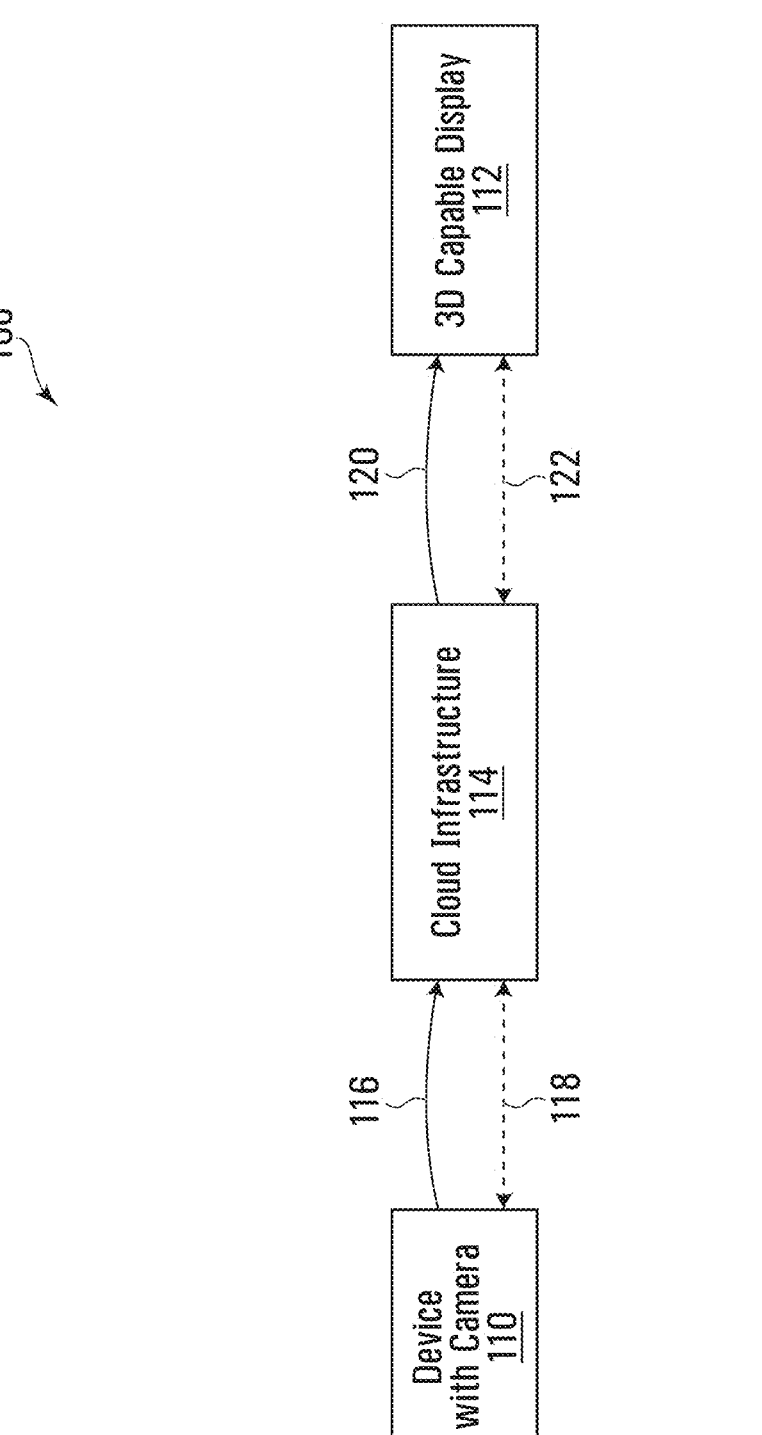
FIGS. 4, 5, and 9 depict block diagrams of a system for three-dimensional electronic communication, according to additional example embodiments.

Referring now to FIG. 4, a block diagram of another embodiment of the system 100 for 3D electronic commu-nication is shown. The system 100 of FIG. 4 comprises a device with a camera such as the first video acquisition device 110, the cloud infrastructure 114, and a 3D capable display such as the first display device 112. As discussed above, the first video data stream 116 transmits video data from the first video acquisition device 110 to the cloud infrastructure 114, the second data stream 120 transmits data from the cloud infrastructure 114 to the first display device 112, and the first and second management data streams 118, 122 bi-directionally transmit call management data between the first video acquisition device 110 and the cloud infra-structure 114, and between the cloud infrastructure 114 and the first display device 112.

The content of the data streams 116, 120 and the tasks performed by the first video acquisition device 110, cloud infrastructure 114, and first display device 112 may change, depending on the particular embodiment. For example, as described above in respect of the example embodiment of FIG. 1, the first video acquisition device 110 comprises the data access subsystem, the preprocessing subsystem, and the stream sender subsystem; the cloud infrastructure 114 com-prises the call management subsystem 612, the stream receiver subsystem 602, the 2D-to-3D reconstruction subsystem 606, the texture reconstruction subsystem 608, the eye area deocclusion subsystem 604, the 3D processing subsystem 610, and the stream sender subsystem; and the first display device 112 comprises the stream receiver subsystem 614, the 3D and texture processing subsystem, and the display subsystem. Consequently, the first video data stream 116 comprises 2D (or 2.5D) data, which the cloud infrastructure 114 processes into volumetric video data with color texture that is contained in the second data stream 120.

The functionality performed by the first video acquisition device 110, the cloud infrastructure 114, and the first display device 112 may vary in different embodiments. For example, in an example embodiment in which the first display device 112 comprises sufficiently powerful hardware (e.g. any sufficiently powerful combination of a central processing unit, graphical processing unit, and neural processor) to perform 3D reconstruction itself, 2D-to-3D reconstruction may be shifted from the cloud infrastructure to the first display device 112. For example, the cloud infrastructure 114 may comprise the call management subsystem 612, the stream receiver subsystem 602, the stream sender subsystem, and a 2D processing subsystem for performing basic 2D processing of video data such as rescaling. And, in addition to comprising the stream receiver subsystem 614, 3D and texture processing subsystem, and display subsystem, the first display device 112 may further comprise the 2D-to-3D reconstruction subsystem 606, the texture reconstruction subsystem 608, and the eye area deocclusion subsystem 604 that are found in the cloud infrastructure 114 in the embodiment of FIG. 6A. In this example embodiment, the video data in the first and second data streams 116, 120 is 2D (or 2.5D) data, and is not reconstructed as 3D data until it arrives at the first display device 112.

Conversely, in at least some example embodiments, 3D processing may be performed upstream of the cloud infrastructure 114 at the first video acquisition device 110. In these example embodiments, the first video acquisition device 110 may comprise the data access subsystem, the preprocessing subsystem, and the stream sender subsystem, and may further comprise the 2D-to-3D reconstruction subsystem 606, the texture reconstruction subsystem 608, the eye area deocclusion subsystem 604, and the 3D processing subsystem 610. The cloud infrastructure 114 accordingly comprises the call management subsystem 614, the stream receiver subsystem, and the stream sender subsystem; and the first display device 112 comprises the stream receiver subsystem 610 and the display subsystem. The 3D and texture processing subsystem may be in either the cloud infrastructure 114 or the first video acquisition device 110. As 3D reconstruction is performed at the first video acquisition device 110 in these embodiments, 3D data is transmitted using the first and second data streams 116, 120.

Figure 5:
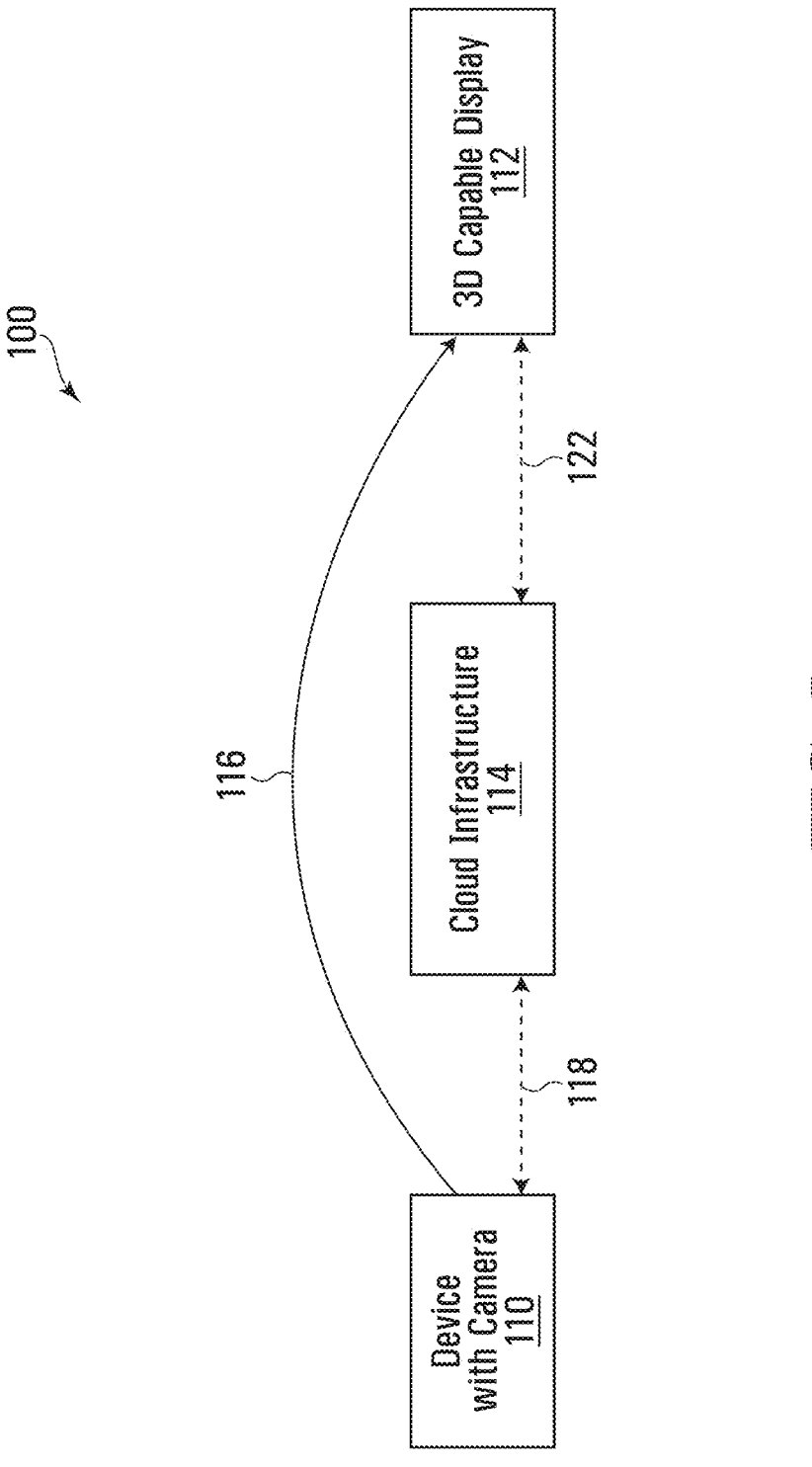

Referring now to FIG. 5, an embodiment of the system 100 in which the first video acquisition device 110 and the first display device 112 communicate on a peer-to-peer basis is shown. In this example embodiment, the cloud infrastructure 114 comprises the call management subsystem 612, and is functionally only responsible for call management as is indicated by the first management data stream 118 being bi-directionally transmitted between the first video acquisition device 110 and the cloud infrastructure 114, and the second management data stream 122 being bi-directionally transmitted between the cloud infrastructure 114 and the first display device 112. As the cloud infrastructure 114 is only responsible for call management, functionality otherwise performed by the cloud infrastructure 114 is shifted to one or both of the first video acquisition device 110 and the first display device 112.

For example, in at least some of the peer-to-peer embodiments, the first video acquisition device 110 comprises the data access subsystem, the preprocessing subsystem, and the stream sender subsystem; and the first display device 112 comprises the stream receiver subsystem 614, the preprocessing subsystem, the 2D-to-3D reconstruction subsystem 606, the texture reconstruction subsystem 608, the eye area deocclusion subsystem 604, the 3D processing subsystem 610, and the display subsystem. Consequently, the first video data stream 116 comprises 2D (or 2.5D) data, which is reconstructed as 3D data at the first display device 112.

Conversely, in at least some other peer-to-peer embodiments, the first display device 112 comprises the stream receiver subsystem 614, the 3D and texture processing subsystem, and the display subsystem; and the first video acquisition device 110 comprises the data access subsystem, the preprocessing subsystem, 2D-to-3D reconstruction subsystem 606, texture reconstruction subsystem 608, eye area deocclusion subsystem 604, 3D processing subsystem 610, and stream sender subsystem. Consequently, the first data stream 116 comprises 3D data.

Image Completion

Figure 8:
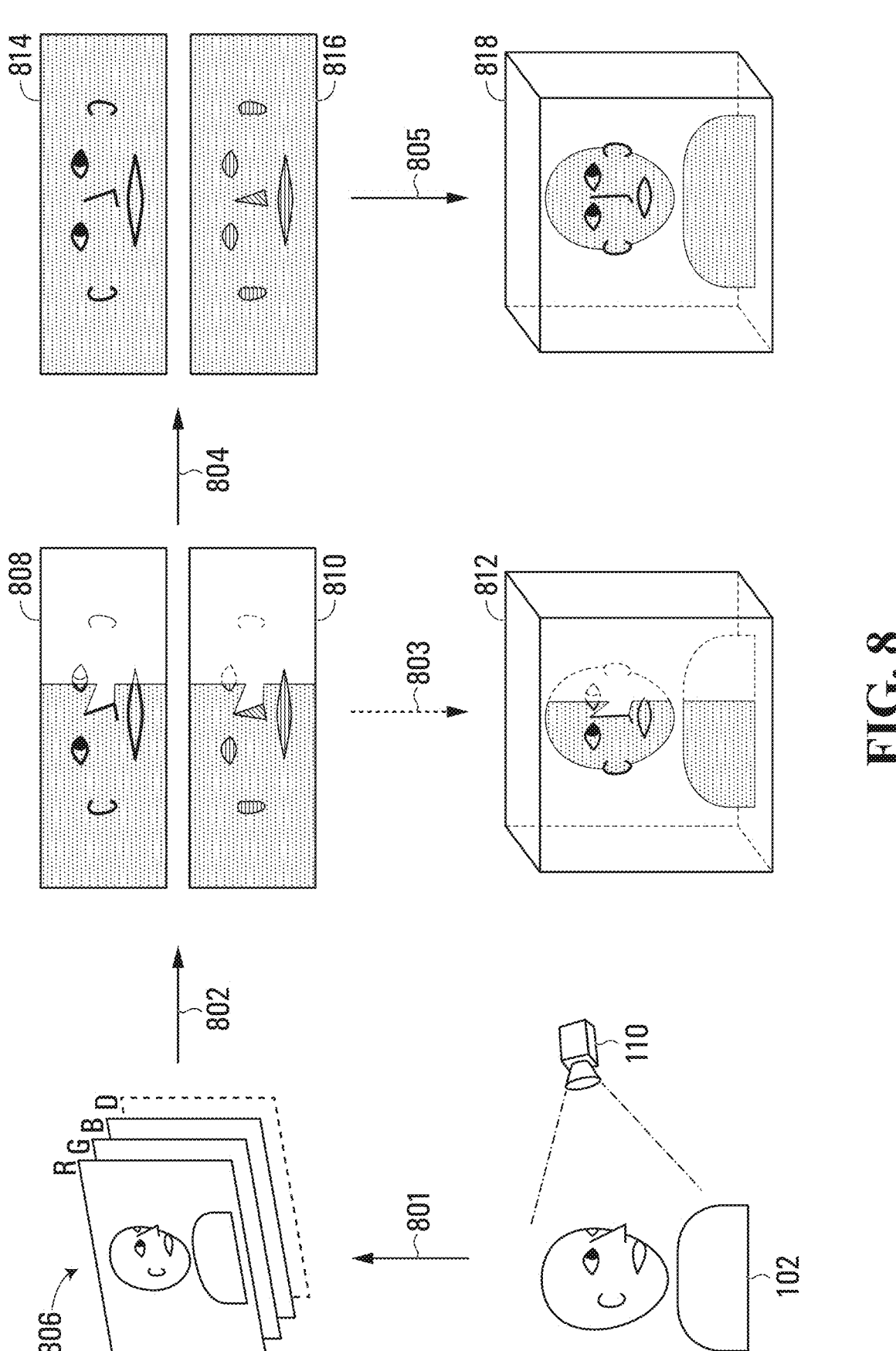

Referring now to FIG. 8, an example process for performing image completion on a 2.5D image acquired of the face of a person, such as the first participant 102, partaking in electronic communication such as a holographic video conference is depicted. "Image completion" refers to filling in missing parts or "holes" of 2.5D image data of the participant's 102 head that cause that image data an incomplete representation of the head such that a complete 3D representation without any missing parts of the head can be generated from that image data. The operations depicted in FIG. 8 may be performed, for example, using the integrated subsystem 616 of the cloud infrastructure 114.

In FIG. 8, the first video acquisition device 110 acquires 2.5D data 806 in the form of a sequence of video frames (arrow 801). The first video acquisition device 110 may comprise, for example, a stereo camera or a 2D camera that further comprises a depth sensor. Each of the video frames of the 2.5D data 806 comprises RGBD channels, with the R, G, and B channels respectively representing red, green, and blue 2D data and the D channel representing depth data. In an alternative embodiment, the video acquisition device 110 may capture only 2D data and depth data may be reconstructed as described above to arrive at the 2.5D data 806. Head alignment data and head segmentation data is also obtained. Head alignment data may comprise head position data (e.g. in Cartesian coordinates) combined with an angle indicating head alignment relative to that position data. In particular, changes in alignment data between consecutive video frames is used for proper rendering. Head segmentation data delineates the separation of the head from the background and from the torso, and may comprise a curve delineating an outline of imaged portions of the head.

Image completion is in some embodiments performed using 2.5D image data that is captured from only certain viewing angles. Accordingly, certain video frames may be filtered out so that completion is not performed on them. For example, video frames depicting extreme view angles of the head (e.g. more than an angle limit, such as 60 degrees off center) or that do not depict a sufficient amount of the face or head may be removed (e.g. less than a face threshold, such as 50% of the face). Frames that are filtered out may be used for image reconstruction despite the fact that reconstructed images based on them may be incomplete.

The 2.5D data 806 is then deterministically projected into an object space (arrow 802), for example as described above in respect of FIGS. 7A-7D above. More particularly, the RGB channels are projected into the object space using the head alignment data and depth data; the head segmentation data may also be used in at least some embodiments. This projection results in a texture object space representation 808; and the D channel is projected into the object space, resulting in a depth object space representation 810. Both object space representations 808,810 have "holes" or missing parts, representing texture or depth data that was not obtained by the video acquisition device 110; see, for example, U.S. Pat. No. 9,904,660, which is incorporated by reference herein. Consequently, a 3D reconstruction 812 generated (arrow 803) based on the object space representations 808,810 is incomplete. Pre-processing (i.e. processing done before completion using neural networks as described below in conjunction with arrow 804) may be performed on the object space representations 808,810. Areas of the object space representations 808,810 close (e.g. within a centimeter) to holes may have lower quality information (e.g. blurriness; color errors) as a result of limitations of the visual and/or depth sensors of the video acquisition device 110. More particularly, steep surface angles and the transition between the participant's 102 head and background represent areas that may be removed and consequently completed using artificial neural networks as described in respect of arrow 804 below. In particular, the transition between the participant's 102 head and background represents a hole because, with the video acquisition device 110 capturing only the front of the participant's 102 head, the entire back of the head represents a hole, with the edge of the head from the perspective of the video acquisition device 110 delineating both the hole and the background. Any small imperfections in head segmentation information can lead to the leaking of background information into the reconstructed 3D image (e.g. the first conference participant's 102 hair may gain a color tint from a wall in the background behind the first conference participant 102). The direct leaking of background into the 3D image is visually unpleasant and perceived as error. To stop this leaking more advanced segmentation can be used. Instead of just depth information-based segmentation or computational model-based segmentation, a combination of both can be used. Removal of the segmentation border can be performed as well, because any lost information will be reconstructed later in the completion process. Similarly, when combining several segmentations of the head, only areas presented in all segmentations can be kept as an output, and any missing portions of the head may be reconstructed later during completion.

Instead of performing a 3D reconstruction based on the incomplete object space representations 808,810, one or more artificial neural networks may be applied (arrow 804) to the object space representations 808,810 to reconstruct them such that the "holes" or missing parts of the representations 808,810 are filled in, thereby performing image completion. Neural networks such as the Pix2Pix generative adversarial network or a convolutional neural network such as AlexNet or U-Net may be used for image completion. The results of completing the incomplete texture and depth object space representations 808,810 are completed texture and depth object space representations 814,816, which may be used to reconstruct (arrow 805) a 3D representation 818 of the participant's 102 face.

Completion may be performed, for example, using a single artificial neural network with four channels input and four channels output, with the four channels representing the RGBD channels. Alternatively, more than four channels may be used for input and/or output, as described further below.

The completed texture and depth object space representations 814,816 may be imperfect reconstructions. For example, particularly along the boundary of reconstructed holes, depth spikes and/or color mismatch may be present. Color mismatch may be addressed by applying, for example, Poisson blending. Depth spikes may be addressed by smoothing or by applying simple thresholding on the depth or depth gradient, or weighted thresholding according to the probability that a depth spike will appear and/or the visual importance of the area. For example, errors may be common when reconstructing the back of the neck by virtue of being in near the ends of the cylindrical representation of the head. However, the back of the neck is a visually unimportant area for electronic communication, so aggressive smoothing may be applied to it or parts of the back of the neck may be removed.

Additionally, while in FIG. 8 the artificial neural network is used to concurrently complete texture and depth, this is not necessary in all embodiments. For example, texture and depth may alternatively be completed separately and independently, and to save computational resources the more computationally expensive neural network-based completion may be reserved for texture completion while relatively less computationally expensive deterministic completion may be used to complete depth.

As mentioned above, more than four channels of data may be input to one or more artificial neural networks for completion. For example, an "alpha channel" may be used to encode the head segmentation data in the incomplete object space representations 808,810 to facilitate completion. In FIG. 8, for example, an alpha channel may delineate the greyed-out portion of the incomplete object space representations 808,810, thereby representing head segmentation information. Additionally or alternatively, an alpha channel may also be used to identify where any holes are in the incomplete object space representations 808,810. For example, a portion of the face adjacent the nose may not be imaged from a certain angle because it is blocked by the nose, resulting in a hole in the incomplete object space representations 808,810; this hole may be represented in the alpha channel in addition to head segmentation information. An alpha channel may, for example, comprise a two-tone picture (e.g. black and white) with one color (e.g. white) representing where the holes and/or head are. Generally speaking, holes may appear in the back of the head by virtue of that portion of the head not being imaged, where this is determined from depth data and head segmentation data, in which the head segmentation data is derived from RGB data; result from geometry of the head (e.g. a portion of the head blocked by another portion of the head such as the nose as described above), where this is determined from depth data and head alignment data, in which the head alignment data is derived from RGB and depth data; or otherwise result from preprocessing.

An alpha channel may similarly be used for depth completion, thus enabling depth completion when depth is input to the neural network with only the RGB channels, or with RGB and Alpha (A) channels. For example, a two-tone picture may be used to indicate portions of the image where depth information is present or absent; alternatively, a particular numeric value (e.g. 0) may correspond with those positions in the image that lack depth data. Depth data may be completed with 2D visual data (e.g. RGBD channels may concurrently be input into a neural network for completion); alternatively, depth data may be completed separately from 2D visual data (e.g. RGB channels may be input into a neural network for completion; and a D channel may be separately entered into a neural network to complete depth apart from completion of the 2D visual data).

Another example of more than four channels of data being used (e.g. more than RGBD) is specifying one or more "normals" (N) channels, which define the direction of normal vectors along the surface to be reconstructed. For example, three normals channels may be specified in conjunction with RGB or RGBD channels, with the three channels representing angles in the x, y, and z directions of the Cartesian coordinate system. In at least some embodiments, for every RGB value, an image with normal information also comprises the normals values; this is in at least some embodiments also done for D and A channels. The normals channel may be input to the artificial neural network for texture (geometry and color) completion. Taking into account the alpha channel and the above examples, example channels that may be input to one or more artificial neural networks together with the normals channel comprise the DN, DAN, RGBN, RGBAN, RGBDN, and RGBDAN channels.

Figures 10A, 10B, 10C:
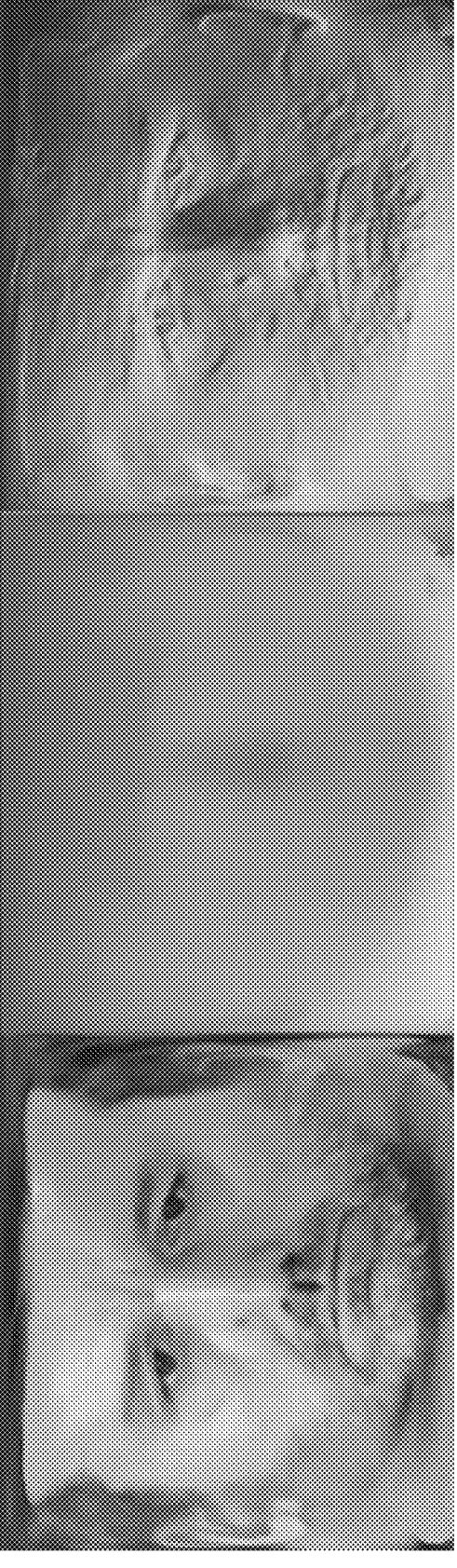
FIGS. 10A-10C depict example representations of RGB channels (FIG. 10A), depth channel (FIG. 10B), and a normals channel (FIG. 10C), which may be used during image completion, according to an example embodiment.

FIGS. 10A-10C depict example representations of RGB channels (FIG. 10A), depth channel (FIG. 10B), and a normals channel (FIG. 10C).

Additionally, to facilitate skin tone color, texture, and depth matching between completed holes and other parts of the participant's 102 head that were visually imaged, multi-frame completion may be used. In multi-frame completion, the input to the neural network is not derived from only a single video frame but from multiple video frames. This may be done, for example, as follows:

1. The holes in the incomplete object space representations 808,810 may be filled using data obtained by the video acquisition device 110 when the portion of the participant's 102 head corresponding to the holes was visible to and imaged by the video acquisition device 110. For example, if there are holes in the incomplete object space representations 808,810 corresponding to the left side of the participant's 102 nose, then depth and/or RGB data obtained by the video acquisition device 110 when the left side of the participant's 102 nose was visible may be input to the artificial neural network and used for completion.

2. Multiple entire frames may be input to the neural network. For example, instead of inputting only the current frame to the neural network, the current frame and several frames selected from the past may be used as input. The past frames may be sampled regularly or irregularly. For example, each of multiple frames may be represented as an RGBD input. Input to the neural network may comprise, for example, certain frames selected based on time and/or characteristics. For example, the input to the neural network may be the RGBD input corresponding to all frames from the last 5 seconds; and/or the past five frames that show head alignment between 0 to 30 degrees, regardless of when those frames were captured. Multiple frames may be input to the artificial neural network used for completion in parallel.

3. Alternatively, the current frame and a frame ("composition frame") generated as an accumulated composition of past frames may be input to the artificial neural network used for completion. For instance, the composition frame can be generated by overlaying those past frames together. In such an overlay, any holes for completion in any one frame may, in at least some embodiments, be transparent. Alternatively, different frames and/or parts of different frames may be differently weighted prior to their being overlaid. For example, more recent frames may be weighted more heavily than frames from further in the past. Additionally or alternatively, the holes in any frames may be semi-transparent to varying degrees of opacity (e.g. anywhere from completely transparent to entirely opaque); for example, while holes for completion may not be completely transparent, they may nonetheless be set to more transparent than, and consequently be weighted less heavily, than parts of frames depicting valid facial imagery.

Figure 9:
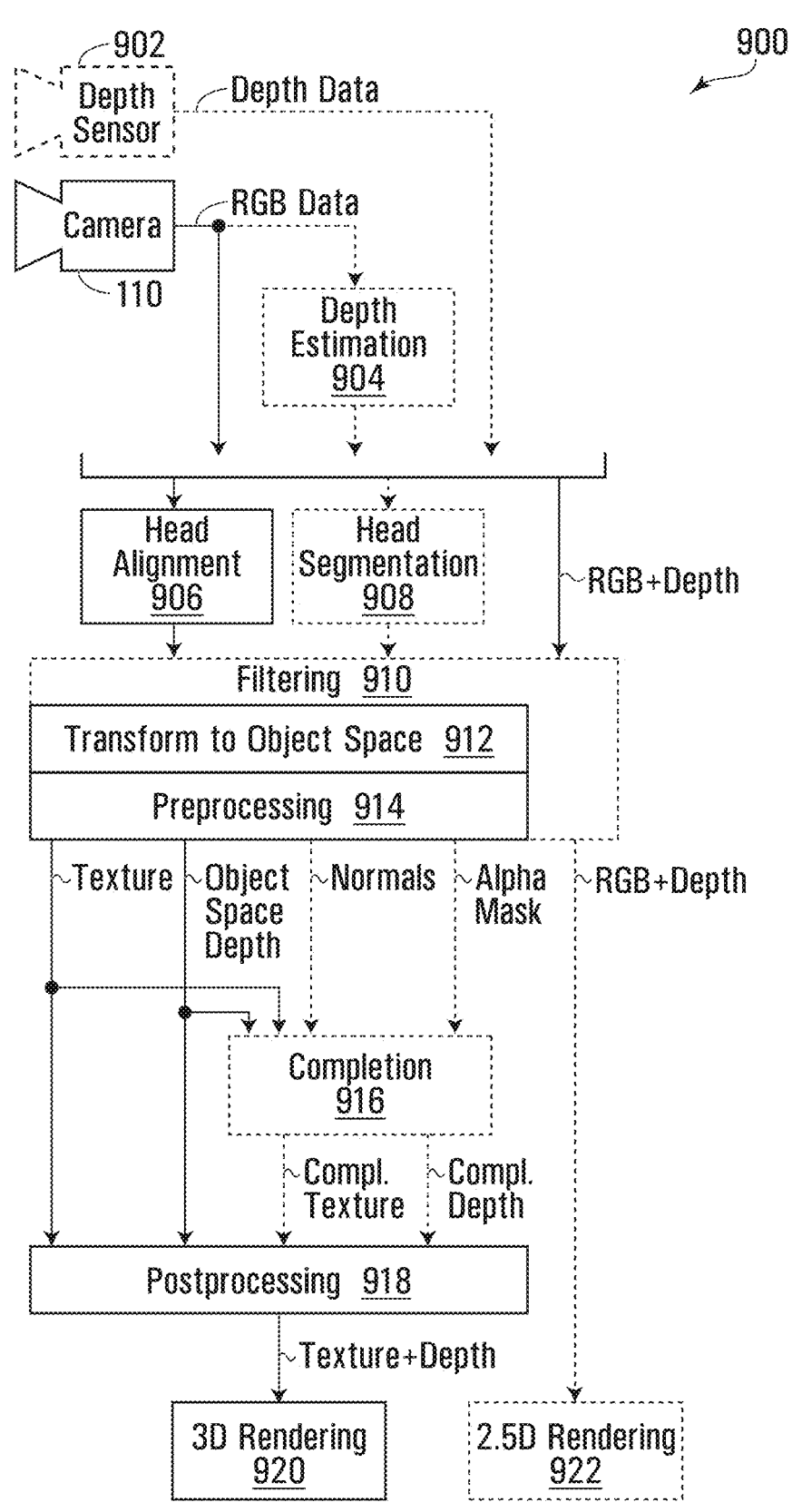

Referring now to FIG. 9, there is shown a block diagram 900 of the system 100 for three-dimensional electronic communication, according to an example embodiment. The block diagram 900 shows an example of the system 100 that comprises the image functionality described above in respect of FIG. 8.

More particularly, the block diagram 900 shows image acquisition being performed using the first video acquisition device 110 and, optionally, a separate depth sensor 902. When the video acquisition device 110 captures 2D video alone, depth estimation may be performed on those 2D images via a depth estimation module 204. When the depth sensor 902 is also used to capture video and consequently the captured video includes a depth channel, the depth estimation module 904 may be bypassed even if depth data is desired. Alternatively, 2D RGB data may be the output directly from the video acquisition device 110 for further processing.

Regardless of whether the video data comprises depth information, the system 100 subsequently processes it to obtain head alignment information via head alignment module 906 and, optionally, to obtain head segmentation information via head segmentation module 908.

The head alignment data, the head segmentation data, and the RGBD data is then sent for optional filtering at a filtering module 910, transformed into the object space at transformation module 912, and preprocessing at preprocessing module 914, as described above in respect of FIGS. 7A-7D and FIG. 8. The output of these operations is texture data with holes, an object space representation of the person represented in the RGBD data, and, optionally, normals and alpha channels as described above in respect of FIG. 8. Image completion is then done using this data at completion module 916, with post-processing being done at post-processing module 918, all as described above in respect of FIGS. 7A-7D and FIG. 8.

Following post-processing, a 3D image is rendered based on the completed image at 3D rendering module 920. Alternatively, a 2.5D image may be rendered using a 2.5D rendering module 922 directly from the RGBD data without image completion.

The completion module 916 may be trained for use with multiple users or a single user. When using training data representing multiple types of users, a multi-person computational model is generated from which it can complete missing parts of unknown users without requiring any additional information about them. Alternatively, the completion module 916 can be trained for a single person (i.e. to result in a user-specific computational model) by being trained using only images acquired from that user. When using training data only for a particular user, the completion module 916 may be trained not to complete 3D images for any user who does not resemble the user used to train the module 916, even if completion may otherwise be possible.

While the depicted embodiments are generally described in the context of 2D-to-3D or 2.5D-to-3D reconstruction, in at least some example embodiments the reconstruction may be a 2.5D reconstruction as opposed to a 3D reconstruction. For example, the 2D-to-3D reconstruction may be simplified as a 2D-to-2.5D reconstruction, and the 2.5D-to-3D reconstruction may be simplified as a 2.5D-to-2.5D reconstruction. For 2.5D reconstruction, 3D scans used as part of the training data mentioned above may be replaced with corresponding 2.5D data.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or part of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is only for the purpose of describing particular embodiments and is not intended to be limiting. Accordingly, as used herein, the singular forms "a", "an", and "the" are intended to include the plural forms as well, unless the context clearly indicates otherwise. It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

A "computer" or "server" used in the foregoing embodiments may comprise, for example, a processing unit (such as a processor, microprocessor, or programmable logic controller, including when they form part of a central processing unit or graphical processing unit) communicatively coupled to a non-transitory computer readable medium having stored on it program code for execution by the processing unit, microcontroller (which comprises both a processing unit and a non-transitory computer readable medium), field programmable gate array (FPGA), system-on-a-chip (SoC), an application-specific integrated circuit (ASIC), or an artificial intelligence accelerator. Examples of computer readable media are non-transitory and include disc-based media such as CD-ROMs and DVDs, magnetic media such as hard drives and other forms of magnetic disk storage, semiconductor based media such as flash media, random access memory (including DRAM and SRAM), and read only memory. In at least some example embodiments, a computer may also be embedded in or otherwise comprise part of a device such as a smartphone, tablet, television set, holographic projector, headset, and other similar or analogous devices.

It is contemplated that any part of any aspect or embodiment discussed in this specification can be implemented or combined with any part of any other aspect or embodiment discussed in this specification, unless those parts are mutually exclusive.

In construing the claims, it is to be understood that the use of computer equipment, such as a processor, to implement the embodiments described herein is essential at least where the presence or use of that computer equipment is positively recited in the claims.

One or more example embodiments have been described by way of illustration only. This description is being presented for purposes of illustration and description, but is not intended to be exhaustive or limited to the form disclosed. It will be apparent to persons skilled in the art that a number of variations and modifications can be made without departing from the scope of the claims.

The invention claimed is:

1. A method comprising:

obtaining image data, head alignment data, and depth data of at least part of a three-dimensional head comprising a face of a conference participant, wherein at least the image data and head alignment data are determined based on two-dimensional or 2.5-dimensional images of the conference participant captured by a camera;

reconstructing a photo-realistic three-dimensional representation of the at least part of the head from the image data, the head alignment data, and the depth data, wherein reconstructing the representation of the at least part of the head comprises reconstructing an area missing from the image data acquired by the camera, wherein reconstructing the representation comprises:

projecting the image data from a world space into an object space using the head alignment data and depth data; and in the object space, completing at least part of the area missing from the image data using a computational model of a person, and wherein completing at least part of the area missing from the image data comprises applying an artificial neural network to reconstruct a texture and a depth of the at least part of the head.

2. The method of claim 1, further comprising obtaining head segmentation data delineating separation of the head from background.

3. The method of claim 2, further comprising encoding the head segmentation data as an alpha channel.

4. The method of claim 3, further comprising:

(a) obtaining information defining at least one hole respectively representing at least one missing portion in the object space, wherein the information defining the at least one hole is obtained from the head segmentation data, depth data, and head alignment data; and (b) encoding the information defining the at least one hole in the alpha channel.

5. The method of claim 1, wherein the computational model is specific to the conference participant.

6. The method of claim 1, wherein the computational model is generated from multiple persons.

7. The method of claim 1, further comprising:

(a) identifying at least one of:

(i) frames of the image data that depict the head from an angle beyond an angle limit; and (ii) frames of the image data that depict parts of the face less than a face threshold; and (b) removing the identified frames from the image data prior to the completing.

8. The method of claim 1, further comprising obtaining a normals channel identifying respective normals for different points on the at least part of the head, and wherein the artificial neural network uses the normals channel during completion.

9. The method of claim 1, wherein the reconstructing is performed based on the image data, the head alignment data, and the depth data retrieved from at least one video frame.

10. The method of claim 9, wherein the reconstructed three-dimensional representation is determined from a current image frame and a composition frame generated from multiple past image frames, wherein the multiple past image frames are sampled at a constant frequency.

11. The method of claim 10, further comprising obtaining head alignment data of the conference participant, and wherein the multiple past image frames are sampled based on the head alignment data.

12. The method of claim 9, wherein the reconstructed three-dimensional representation is determined from a current image frame and a composition frame generated from multiple past image frames, wherein the multiple past image frames are irregularly sampled.

13. The method of claim 1, further comprising, after the completing, smoothing or removing a back of the head.

14. The method of claim 1, further comprising training the artificial neural network prior to the reconstructing, wherein the training comprises:

capturing, using multiple cameras, multiple views of the face of the conference participant from different perspectives to obtain time-synchronized images comprising red, green, blue and depth channels;

stitching the time-synchronized images together to generate three-dimensional training data comprising a complete version of the face of the conference participant; and training the artificial neural network using the training data.

15. The method of claim 1, further comprising training the artificial neural network prior to the reconstructing, wherein the training comprises:

capturing, using a single camera, multiple images of the face of the conference participant, wherein the multiple images are captured from different angles and show differential facial expressions of the conference participant;

stitching the multiple images together to generate three-dimensional training data comprising a complete version of the face of the conference participant; and training the artificial neural network using the training data.

16. The method of claim 1, further comprising training the artificial neural network prior to the reconstructing, wherein the training comprises:

retrieving from storage a recording of a three-dimensional video comprising the face of the conference participant;

stitching different frames of the recording together to generate three-dimensional training data comprising a complete version of the face of the conference participant; and training the artificial neural network using the training data.

17. A system comprising:

a network interface;

a processor communicatively coupled to the network interface; and a non-transitory computer readable medium communicatively coupled to the processor and having stored thereon computer program code that is executable by the processor and that, when executed by the processor, causes the processor to perform a method comprising:

obtaining image data, head alignment data, and depth data of at least part of a three-dimensional head comprising a face of a conference participant, wherein at least the image data and head alignment data are determined based on two-dimensional or 2.5-dimensional images of the conference participant captured by a camera;

reconstructing a photo-realistic three-dimensional representation of the at least part of the head from the image data, the head alignment data, and the depth data, wherein reconstructing the representation of the at least part of the head comprises reconstructing an area missing from the image data acquired by the camera, wherein reconstructing the representation comprises:

projecting the image data from a world space into an object space using the head alignment data and depth data; and in the object space, completing at least part of the area missing from the image data using a computational model of a person, and wherein completing at least part of the area missing from the image data comprises applying an artificial neural network to reconstruct a texture and a depth of the at least part of the head.

18. The system of claim 17, further comprising a camera communicatively coupled to the processor, the camera for capturing an image of the conference participant.

19. The system of claim 17, further comprising a display device communicatively coupled to the processor, and wherein the method further comprises displaying the reconstructed three-dimensional representation on the display.

20. A non-transitory computer readable medium having encoded thereon computer program code that is executable by a processor and that, when executed by the processor, causes the processor to perform a method comprising:

obtaining image data, head alignment data, and depth data of at least part of a three-dimensional head comprising a face of a conference participant, wherein at least the image data and head alignment data are determined based on two-dimensional or 2.5-dimensional images of the conference participant captured by a camera;

reconstructing a photo-realistic three-dimensional representation of the at least part of the head from the image data, the head alignment data, and the depth data, wherein reconstructing the representation of the at least part of the head comprises reconstructing an area missing from the image data acquired by the camera, wherein reconstructing the representation comprises:

projecting the image data from a world space into an object space using the head alignment data and depth data; and in the object space, completing at least part of the area missing from the image data using a computational model of a person, and wherein completing at least part of the area missing from the image data comprises applying an artificial neural network to reconstruct a texture and a depth of the at least part of the head.

* * * * *